(12) United States Patent
Kawabe et al.

(10) Patent No.: US 6,604,424 B1
(45) Date of Patent: Aug. 12, 2003

(54) PRESSURE DETECTING APPARATUS AND INSTALLATION STRUCTURE OF SAME

(75) Inventors: Yasuyuki Kawabe, Okazaki (JP); Tokio Kohama, Nishio (JP); Kiyohiko Watanabe, Okazaki (JP); Yukihiro Kato, Kariya (JP); Yoshifumi Watanabe, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 215 days.

(21) Appl. No.: 09/588,500

(22) Filed: Jun. 7, 2000

(30) Foreign Application Priority Data

Jun. 16, 1999 (JP) .............................. 11-169891
Apr. 19, 2000 (JP) ........................ 2000-118325

(51) Int. Cl.$^7$ ................................................ G01L 13/02
(52) U.S. Cl. ........................................................ 73/716
(58) Field of Search ..................... 73/716, 118, 118.2; 123/494, 488, 492

(56) References Cited

U.S. PATENT DOCUMENTS

| 4,489,595 A | 12/1984 | Klomp et al. |
| 4,969,354 A | * 11/1990 | Kosuda et al. ................ 73/118 |

FOREIGN PATENT DOCUMENTS

| EP | 0 350 612 A2 | 1/1990 |
| JP | A-58-174145 | 10/1983 |
| JP | A-60-93328 | 5/1985 |
| JP | A-63-229341 | 9/1988 |
| JP | 8-304208 | 11/1996 |

* cited by examiner

Primary Examiner—Edward Lefkowitz
Assistant Examiner—C. Dickens
(74) Attorney, Agent, or Firm—Posz & Bethards, PLC

(57) ABSTRACT

A pressure detecting apparatus having a pressure introducing pipe is installed on an intake surge tank for detecting inner pressure in the intake surge tank. The intake surge tank is provided with a throttle passage having a throttle is disposed in the intake surge tank along a flow direction of the gas for increasing a flow speed of the gas. A pressure inlet at a leading end of the pressure introducing pipe is positioned in a vicinity of the throttle.

25 Claims, 22 Drawing Sheets

PRESSURE DETECTING APPARATUS AND INSTALLATION STRUCTURE OF SAME

CROSS REFERENCE TO RELATED APPLICATION

This application is based upon and claims the benefit of priority of Japanese Patent Applications No. H.11-169891 filed on Jun. 16,1999, the content of which is incorporated herein by reference.

BACKGROUND OF THE INVENTION

1. Field of the Invention

The present invention relates to a pressure detecting apparatus having a pressure introducing pipe installed on pipe members for intake and exhaust systems of internal combustion engines such as an intake surge tank and an exhaust pipe for detecting pressure in the intake and exhaust systems and an installation structure of the same on the pipe members

2. Description of Related Art

A conventional installation structure of a pressure detecting apparatus J1 is shown in FIGS. 23A and 23B. In internal combustion engines for vehicles, a detection of inner pressure in an intake surge tank (pipe member) 100 of an engine EN becomes necessary mainly for fuel injection control. Therefore, as shown in FIG. 23A, the pressure detecting apparatus J1 is installed on the intake surge tank 100 with an airtight connection therewith. A throttle body 101, an intake duct 102, an air cleaner 103 and the intake surge tank 100 constitute the intake system.

FIG. 23B shows a schematic cross sectional view of the pressure detecting apparatus J1 installed on the intake surge tank 100. The pressure detecting apparatus J1 is provided with a pressure chamber 11, on inner wall of which a pressure detecting element 10 is mounted. The pressure chamber 11 is communicated with an inner space 100a of the intake surge tank 100 through a passage 12a of a pressure introducing pipe 12. A sealing member 13 such as an O ring is provided for securing an airtight connection of the pressure detecting apparatus J1 with the intake surge tank 100.

The pressure detecting apparatus J1 is fixed to the intake surge tank 100 by screws or adhesives. With the structure mentioned above, the pressure in the intake surge tank 100 is introduced from the passage 12a of the pressure introducing pipe 12 to the pressure chamber 11 and detected by the detecting element 10.

A blow-by gas introducing pipe 104 is generally connected to the intake surge tank 100 for internal combustion engines. This is not for releasing to an atmosphere the blow-by gas escaped to a crank room through a gap between a cylinder liner and a piston ring, when fuel mixture is burned in a combustion chamber, but for returning the same to the intake system for combustion. As shown in FIG. 24A illustrating a partly exploded inside view of the intake surge tank 100, the blow-by gas introducing pipe 104 is communicated with inside of the intake surge tank 100. The blow-by gas includes a plenty of emission 105 containing dirty material such as moisture and oil.

The dirty material not only floats at a gaseous state in the inside of the intake surge tank 100 but also adheres at a liquid state to inner walls of the intake surge tank 100. That is, the inside of the intake surge tank 100 is filled with dirty material.

In an EGR system in which a part of exhaust gas is mixed with fuel mixture to reduce a combustion temperature in the combustion chamber so that formation of $NO_x$, nitrogen oxide, may be limited, an EGR introducing pipe is also connected to the intake surge tank 100 for returning the part of exhaust gas to the intake surge tank 100. Dirty material also floats and adheres to the inside of the intake surge tank 100, similarly as is done by the blow-by gas introducing pipe.

An opening and closing movement of an intake valve according to an operation of the internal combustion engine causes intake air to flow and to interrupt to flow so that aerial vibration or pressure variation in a short period of cycle, that is, a pressure pulsation, may occur in the intake surge tank 100 (intake pipe). As shown in FIG. 24B, which shows a measurement result of the inner pressure of the intake surge tank 100 when a vehicle runs at a speed of 90 km/h, the pressure pulsation in a 15 ms cycle and with 6.7 kPa amplitude (fluctuation of pressure) can be observed.

The pressure detecting apparatus J1 has the airtight connection with the intake surge tank 100, as shown in FIG. 24B. When the pressure pulsation in the intake surge tank 100 occurs and the pressure is changed from a low point 110 to a high point 111, as shown in FIG. 24B, an air flow K1 toward the pressure chamber 11 from the inside space 100a through the passage 12a takes place instantaneously, as shown in FIG. 24C.

This is due to a reason that, even if the pressure is changed instantaneously from the low point 110 to the high point 111 and the entire pressure in the inside space 100a of the intake surge tank 100 becomes high, there exists a time delay before inner pressure of the pressure chamber 11 becomes high and low pressure is kept in the pressure chamber 11 for a very short period of time, since the passage 12a between the pressure chamber 11 and the intake surge tank 100 is narrow. Therefore, the air flow K1 takes place from the inside space 10a of the intake surge tank 100 with high pressure to the pressure chamber 11 with low pressure.

Then, after the pressure in the pressure chamber 11 has become high, when the pressure of the inside space 100a of the intake surge tank 100 is changed to a point 112, as shown in FIG. 24B, on the contrary to the above mentioned phenomenon, an air flow K2 toward the inside space 100a from the pressure chamber 11 through the passage 12a takes place, as shown in FIG. 24C. Gas is exchanged between the inside space 100a and the pressure chamber 11 by the air flow K1 and K2 which alternately take place.

The gaseous dirty material 105 and the liquid dirty material 106 in the inside space 100a of the intake surge tank 100 passing through the passage 12a of the pressure introducing pipe 12 adhere to and accumulate on inner walls of the passage 12a and the pressure chamber 11. When liquid material having a high viscosity such as oil are adhered to a surface of the detecting element 10, responsiveness of the detecting element 10 becomes slow so that an accurate pressure may not be detected.

To cope with the invasion of the dirty material, there have been proposed various methods that a pressure detecting device is communicated with a bypass passage provided so as to flow intake air from other than a throttle valve main passage or the pressure detecting device is communicated with a bypass passage provided so as to flow intake air for idling combustion, as shown in JP-A-63-229341, JP-A-2-124440, JP-A-3-277935, JP-A-6-129935 and JP-A-6-137984.

However, in the methods mentioned above, not only a complicated passage has to be provided, but also fuel mixture ratio has to be controlled in consideration of an air flow volume in the bypass passage which is variable according to the inner pressure of the intake surge tank. Further, when dirty material is accumulated in the bypass passage to an extent that the air flow volume therein is reduced, the fuel mixture ratio control becomes more complicated. As the case may be, the air flow volume in the bypass passage has to be detected separately by an air flow detecting device.

Furthermore, as shown in JP-A-63-295940, there is proposed a method that liquid material (water in this case) entered into the pressurized passage is vaporized and eliminated by electric heating. According to this method, a device for controlling the electric heating and a circuit thereof have to be equipped in the pressure detecting device for the intake pipe, resulting in a complicated construction and higher cost.

Moreover, as shown in JP-U-57-138037 and JP-U-62-35244, there is a method that invaded dirty material is accumulated in a room provided separately before entering into the pressure detecting device. However, the accumulating capacity of the room has a predetermined upper limit and, if the accumulated volume of the invaded dirty material exceeds the limit, the dirty material enters into the pressure detecting device.

The various problems mentioned above such as the necessity of the complicated passages and the device and circuit separately provided for air flow control are also applicable to an exhaust gas pressure detecting device installed on pipe members of the exhaust gas systems for internal combustion engines.

SUMMARY OF THE INVENTION

An object of the present invention is to provide a first installation structure of a pressure detecting apparatus on an intake and exhaust system, according to which dirty material contained in the gas (intake air or exhaust gas) flowing in the intake and exhaust gas system are unlikely to enter into the pressure detecting apparatus.

To achieve the object, in the structure of installing the pressure detecting apparatus on a pipe member for an intake and exhaust system of an internal combustion engine in which gas flows according to an operation of the internal combustion engine, a pressure introducing pipe having a pressure inlet and a pressure outlet is connected on a side of the pressure inlet to the pipe member and on a side of the pressure outlet to the pressure detecting device so that inner pressure in the pipe member may be introduced to and detected by the pressure detecting apparatus, a throttle passage having a throttle is disposed in the pipe member along a flow direction of the gas for increasing a flow speed of the gas and the pressure inlet is positioned in a vicinity of the throttle.

With a compact structure with the throttle as mentioned above, the throttle causes to increase the flow speed of the gas just before the pressure inlet in order for the dirty material contained in the gas not to be stagnant. As a result, the invasion of the dirty material into and the adhesion of the same to the pressure detecting apparatus may be limited.

It is preferable that the pressure inlet is positioned on a down stream side of the gas flow with respect to the throttle, more preferably, 3 to 50 mm far away from the throttle in the flow direction of the gas in view of the compact structure effective for preventing the dirty material due to the increased gas flow speed.

To achieve effectively the increased gas flow speed, a gas flow cross sectional area of an exit of the throttle passage is, preferably, larger than that of the throttle but smaller than that of the entrance of the throttle passage. In more details, a ratio of the gas flow cross sectional areas of the throttle, the exit and the entrance falls within a range from 1:5:10 to 1:50:70. Further, it is preferable that a length of the throttle passage from the entrance to the exit is 10 mm to 100 mm and an inner diameter of the throttle is 1 mm to 10 mm.

If the pressure introducing pipe has a projecting portion protruding from an inner wall of the throttle passage into an inside of the throttle passage to position the pressure inlet into the inside of the throttle passage, the dirty material transferred along the inner wall of the throttle passage is unlikely to be entered into the pressure inlet.

Preferably, a length of the projecting portion is 3 mm to 15 mm and a gap between the pressure inlet and the throttle in a protruding direction of the pressure introducing pipe into the throttle passage is 1 mm to 5 mm. The pressure inlet is, preferably, opened toward a downstream of the gas flow for more effectively limiting the invasion of the dirty material into the pressure detecting apparatus.

It is another aspect of the present invention to provide a second structure of installing a pressure detecting apparatus on a pipe member for an intake and exhaust system of an internal combustion engine in which gas flows according to an operation of the internal combustion engine. The second structure is provided with a pressure introducing pipe having a pressure inlet and a pressure outlet, which is connected on a side of the pressure inlet to the pipe member and on a side of the pressure outlet to the pressure detecting apparatus so that inner pressure in the pipe member may be introduced to and detected by the pressure detecting apparatus. The pressure introducing pipe has a projecting portion partly protruding into an inside of the pipe member to open the pressure inlet toward a downstream of the gas flow and the projecting portion on an upstream side of the gas flow is provided with a tapered portion inclined by a predetermined angle with respect to an protruding direction of the pressure introducing pipe into the pipe member.

The pipe member may be provided with a throttle passage. In this case, the projecting portion of the pressure introducing pipe may protrude into an inside of the throttle passage.

With he second structure mentioned above, the projecting portion of the pressure introducing pipe may smoothly repel the gas flow due to the tapered portion inclined by a predetermined angle. Further, as the pressure inlet is opened toward a downstream of the gas flow, in addition to the tapered portion, the invasion of the gas flow into the pressure inlet may be effectively limited. The predetermined angle is, preferably, 10 to 70 degrees angle.

To make the gas flow more smoothly repel, it is preferred that the projecting portion on an upstream side of the gas flow is shaped convex to constitute an acute angle portion having 10 to 70 degrees in a cross section thereof perpendicular to the protruding direction of the pressure introducing pipe into the pipe member or the throttle passage.

A cross section of the projecting portion perpendicular to the protruding direction of the pressure introducing pipe into the pipe member or the throttle passage may be formed in a shape of an ellipse having a long axis in a flow direction of the gas to expel much more smoothly the gas flow. Preferably, the ellipse is a streamlined shape whose area is narrower on a downstream side of the gas flow.

It is preferred that a gas flow area at an opening portion of the pressure inlet is not larger than that at any other portion of the pressure introducing pipe. That is, the gas flow area at an opening portion of the pressure inlet may be equal to or $4/5$ to $1/10$ of the gas flow cross sectional area of the pressure introducing pipe.

A filter element having ventilating holes for preventing dirty material may be provided inside the pressure introducing pipe between the inlet and the outlet.

If a blow-by gas introducing pipe or an EGR introducing pipe is connected to the pipe member, it is preferable that the pressure introducing pipe is connected to the pipe member on a downstream side of the gas flow with respect to the blow-by gas introducing pipe or the EGR introducing pipe.

It is a further aspect of the present invention to provide a third installation structure of installing a pressure detecting apparatus on a pipe member for an intake and exhaust system of an internal combustion engine in which gas flows according to an operation of the internal combustion engine. The further installation structure is provided with a pressure introducing pipe having a pressure inlet and a pressure outlet, which is connected on a side of the pressure inlet to the pipe member and on a side of the pressure outlet to the pressure detecting apparatus so that inner pressure in the pipe member may be introduced to and detected by the pressure detecting apparatus. The pressure introducing pipe has a projecting portion partly protruding an inside of the pipe member to open the pressure inlet toward a downstream of the gas flow and the pressure inlet is formed in a slit shape long narrow along a protruding direction of the projecting portion into the pipe member.

With the structure mentioned above, the invasion of the gas flow into the pressure inlet may be effectively prevented since the pressure inlet is formed in a slit shape long narrow along a protruding direction of the projecting portion into the pipe member.

It is another object of the present invention to provide a pressure detecting apparatus into which dirty material contained in the gas flowing in the intake and exhaust gas system are unlikely to enter.

To achieve the object, in the pressure detecting apparatus to be installed on a pipe member for an intake and exhaust system of an internal combustion engine in which gas flows according to an operation of the internal combustion engine, a pressure introducing pipe has a first and second passages the first passage has a gas entrance and a gas exit on opposite ends thereof, which are opened to an inside of the pipe member, and the second passage is connected at one end thereof to the first passage between the gas entrance and the gas exit and at another end to the pressure detecting apparatus so that a part of the gas flowing in the pipe member bypasses the first passage and flows from the gas entrance to the gas exit due to a pressure difference between the gas entrance and gas exit, while inner pressure in the pipe member may be introduced through the pressure introducing pipe to and detected by the pressure detecting apparatus.

With the apparatus mentioned above, the invasion of the dirty material contained in the gas in the intake and exhaust system into a detecting chamber may be prevented.

It is preferable that the gas entrance is positioned on an upstream side of the gas flow and the gas exit is positioned on a downstream side of the gas flow in the pipe member to obtain a larger pressure difference between the gas entrance and the gas exit.

A gas flow cross sectional area of the first passage is, preferably, larger than that of the second passage. That is, the gas flow cross sectional area of the first passage may be within a range of 5 to 320 mm$^2$ and a total length thereof may be with in a range of 5 to 100 mm, and the gas flow cross sectional area of the second passage may be within a range of 5 to 320 mm$^2$ and a total length thereof may be within a range of 1 to 100 mm.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1A:
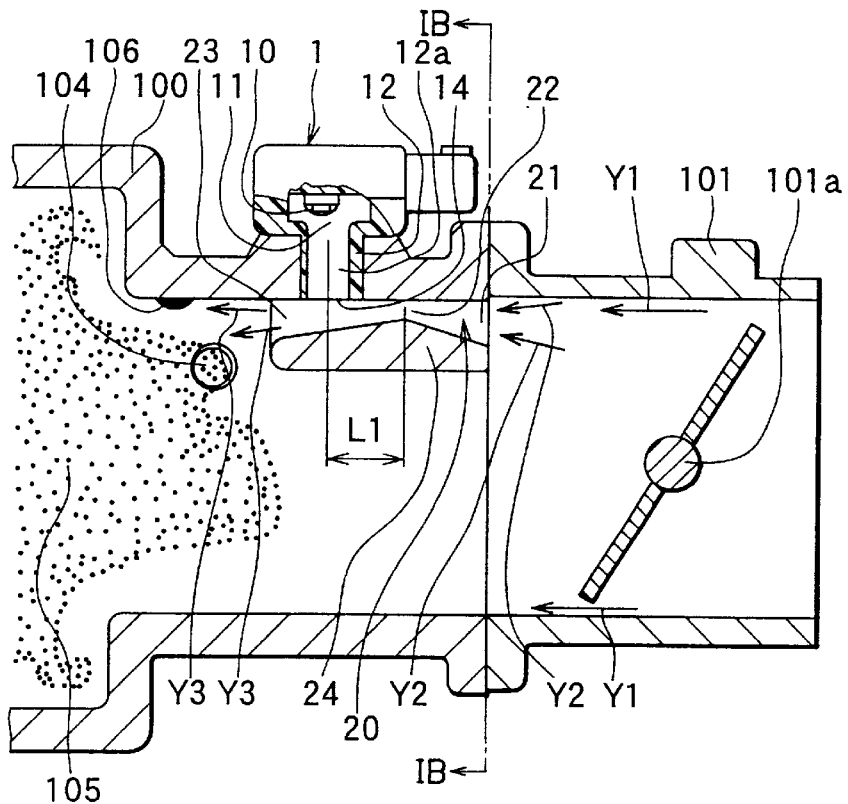
FIG. 1A is a cross sectional view of an installation structure of a pressure detecting apparatus according to a first embodiment of the present invention.
Figure 1B:
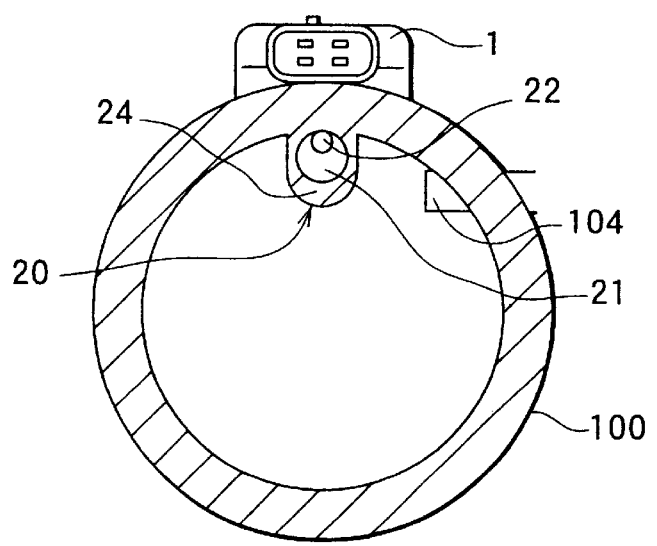
FIG. 1B is a cross sectional view taken along a line I B-IB of FIG. 1A.

FIG. 1A shows a cross sectional view of an installation structure of a pressure detecting apparatus 1 according to a first embodiment of the present invention and FIG. 1B is a cross sectional view taken along a line IB—IB of FIG. 1A.

Figure 23A:
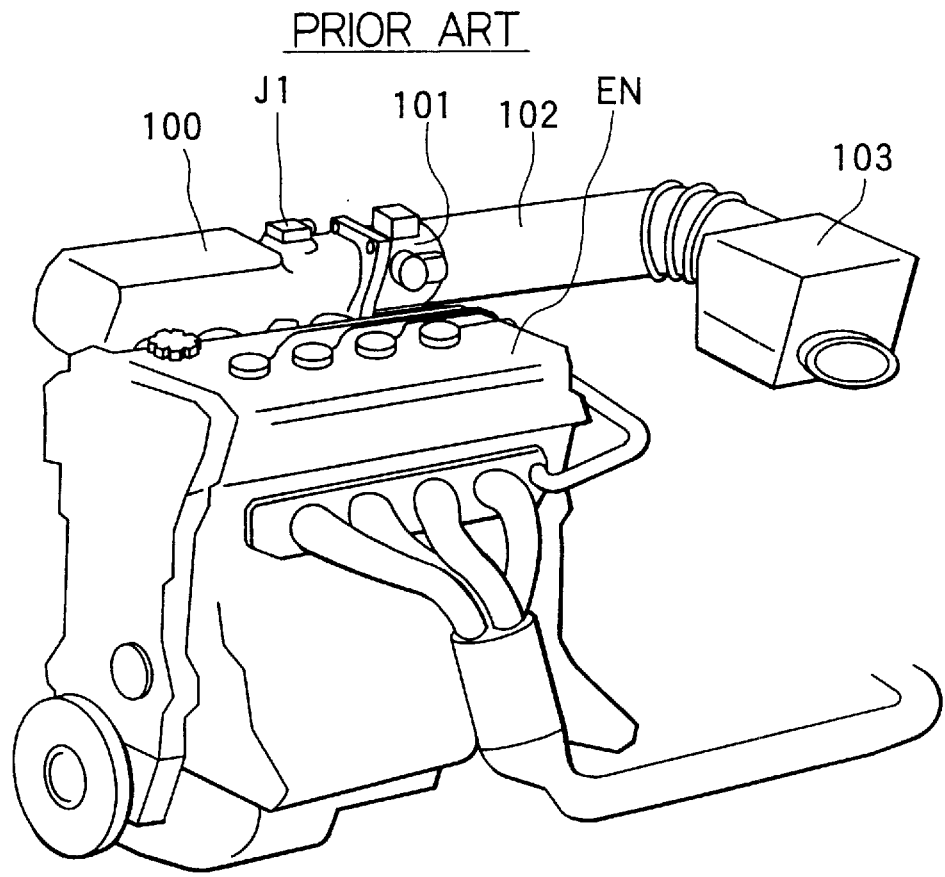
FIG. 23A is a perspective view of a conventional installation structure of a pressure detecting apparatus as a prior art.
Figure 23B:
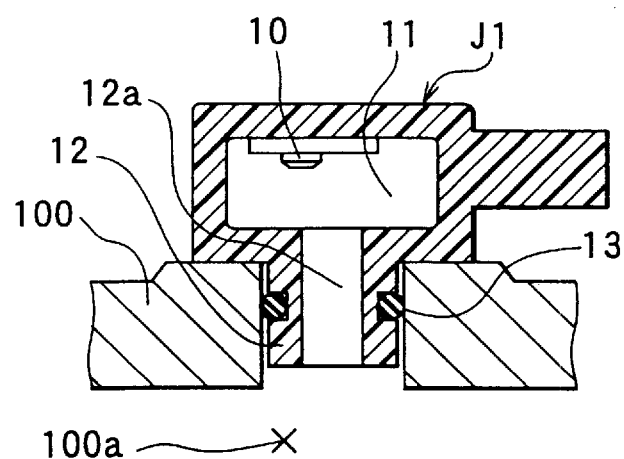
FIG. 23B is a cross sectional part view of the pressure detecting apparatus of FIG. 23A.
Figure 24A:
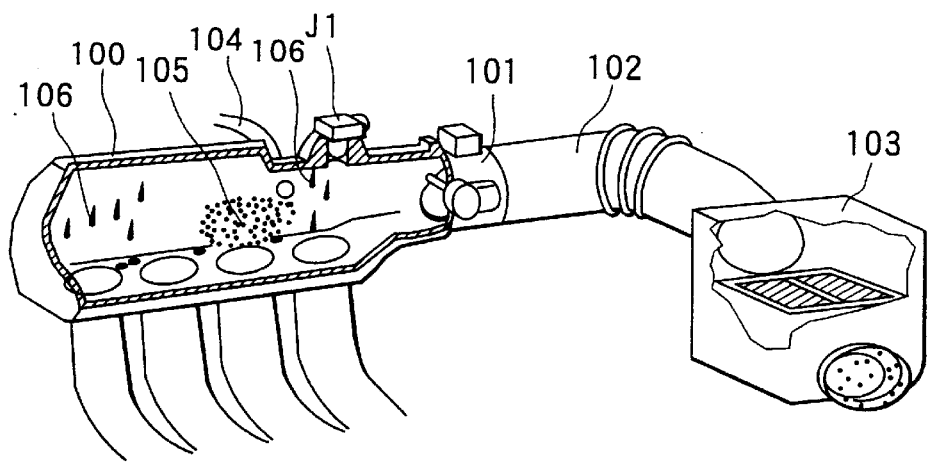
FIG. 24A is a partly exploded view showing an inside of an intake surge tank.
Figure 24B:
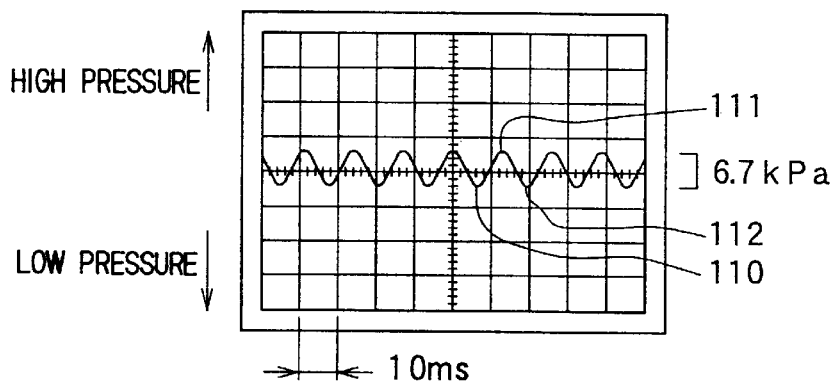
FIG. 24B is a chart showing a pressure pulsation inside the intake surge tank.
Figure 24C:
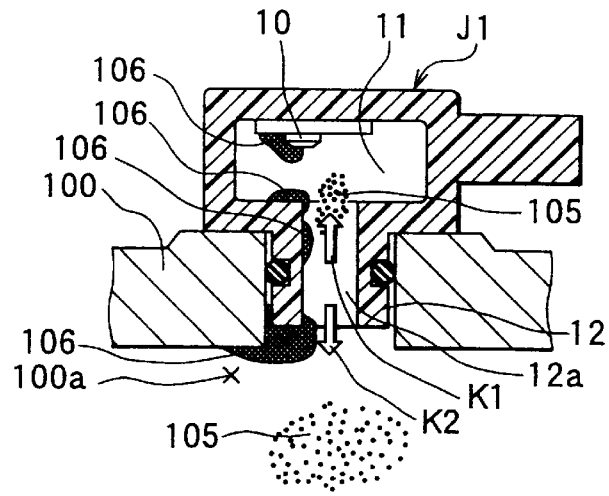
FIG. 24C is a cross sectional view of the pressure detecting apparatus showing a gas exchange.

The pressure detecting device 1 according to the first embodiment is installed on an intake surge tank 100, which constitutes a pipe member of an intake system for an internal combustion engine EN, similarly as a pressure detecting apparatus J1 is installed as shown in FIGS. 23A and 23B. The pressure detecting apparatus 1 introduces pressure of the inside of the intake surge tank 100 through a pressure introducing pipe 12 connected with the intake surge tank 100.

As shown in FIG. 1A, a throttle body 101 having a throttle valve 101a is connected without a clearance by fastening means such as screws to the intake surge tank 100. According to the opening of the throttle valve 101a responsive to a driving operation of the internal combustion engine EN, air (intake air) necessary for combustion flows in a direction shown by an arrow Y1.

The intake surge tank is provided inside thereof with a throttle passage 20 extending along the flow direction Y1 of the intake air, that is, from a side of the throttle valve 101a toward the intake surge tank 100. A part of the intake air flows in the throttle passage 20 from an entrance 21 thereof as shown by an arrow Y2 and flows out of the throttle passage 20 from an exit 23 thereof as shown by an arrow Y3.

An inner wall 24 of the throttle passage 20, which is made of metal material (for example, aluminum), is formed integrally with an inner wall of the intake surge tank 100. A portion where an inner diameter of the throttle passage 20 is smallest (cross sectional area of the throttle passage 20 is narrowest) constitutes a throttle 22. A flow speed of the intake air as shown in the arrows Y2 and Y3 increases at the throttle 22 based on a Bernoulli's theorem in hydrodynamics.

A pressure detecting element 10 is disposed in a pressure chamber 11 of the pressure detecting apparatus 1 for detecting the pressure of the intake surge tank 100 introduced to the pressure chamber 11 through the pressure introducing pipe 12. One end of the pressure introducing pipe 12, which penetrates the inner wall of the intake surge tank 100 and constitutes an pressure inlet 14, is opened to the inside of the intake surge tank 100 and the other end of the pressure introducing pipe 12 is opened to the pressure chamber 11. The pressure chamber 11 is communicated with the inside of the intake surge tank 100 through a passage 12a of the pressure introducing pipe 12. The pressure chamber 11 and the pressure introducing pipe 12 are formed by, for example, resin molding.

The pressure introducing pipe 12 is fitted into the wall of the intake surge tank 100 via a sealing member such as o rings (not shown in FIGS. 1A and 1B). The pressure detecting apparatus 1 is installed on and connected airtightly by adhesives and screws to the intake surge tank 100 in a vicinity of the throttle passage 20. The pressure inlet 14 is opened to the inside of the throttle passage 20 in a vicinity of the throttle 22 in a manner that the flow speed of the intake air may increase just before the pressure inlet 14. The throttle passage 20 is positioned right under the pressure detecting apparatus, when viewed from a side of the entrance 21, as shown in FIG. 1B.

With the installation structure of the pressure detecting apparatus 1 mentioned above, the pressure of the intake surge tank 100 is introduced from the pressure inlet 14 through the passage 12a of the pressure introducing pipe 12 to the pressure chamber 11 and is detected by the pressure detecting element 10.

A blow-by gas introducing pipe 104 is connected to the intake surge tank 100, as mentioned before. Not only gaseous dirty gas 105 containing dirty material 106 such as moisture and oil flown from the blow-by gas introducing pipe 104 is filled in the intake surge tank 100, but also liquid dirty material 106 such as moisture and oil adhere to the inner wall of the intake surge tank 100. These phenomena occur in a case of an EGR introducing pipe 104, too.

According to the first embodiment, when the part of the intake air flows into the throttle passage 20 as shown by the arrow Y2 and flows out of the throttle passage 20 as shown by the arrow Y3, the dirty gas 105 and the dirty material 106 stagnant in the intake surge tank is blown off before entering into the pressure detecting apparatus from the pressure inlet 14 of the pressure introducing pipe 12, since the flow speed of the intake air becomes faster at the throttle 22. As a result, invasion of the dirty material into the pressure detecting apparatus 1 may be limited so that a reliability of the pressure detecting apparatus 1 may be enhanced.

As mentioned above, as the throttle 22 is provided in a vicinity of the pressure inlet 14 at a downstream of the throttle valve 101a for increasing the flow speed of the air (intake air) flowing from the throttle valve 101a, the dirty material may pass through the pressure inlet 14 at a higher flow speed. This structure is so compact and effective that the invasion of the dirty material into the pressure detecting apparatus may be prevented without using complicated bypass passages or detecting devices separately provided.

Though the pressure inlet 14 of the pressure detecting apparatus 1 may position on any one of upstream and downstream sides of the throttle 22, if positions in the vicinity of the throttle, as the throttle 22 causes to increase the flow speed of the intake air so that the dirty material may not come near the throttle 22, it is preferred that the pressure inlet 14 opened to the throttle passage 20 positions on a downstream side of the intake air with respect to the throttle 22 (on a side of the exit 23). In more details, a center axis of the pressure introducing pipe 12 positions at a place a little away from the throttle 22 on a downstream side of the intake air, for example, 3 to 50 mm away from the throttle 22 as a length L1 shown in FIG. 1A.

Further, it is preferable to more effectively increase the flow speed that a cross sectional gas flow area (inner diameter) of the exit 23 is larger than that of the throttle 22 but smaller than that of the entrance 21. A ratio of the cross sectional gas flow areas of the throttle 22, the exit 23 and the entrance 21, preferably, falls within a range from 1:5:10 to 1:50:70. Furthermore, it is preferable that a length of the throttle passage 20 from the entrance 21 to the exit 23 is 10 mm to 100 mm and an inner diameter of the throttle passage 20 at the throttle 22 is 1 mm to 10 mm.

The range of the dimensional values mentioned above is defined in view of effectively preventing the invasion of the dirty material into pressure detecting apparatus in a normal use of the various kinds internal combustion engines EN and achieving the compact installation structure of the pressure detecting apparatus.

Figure 2:
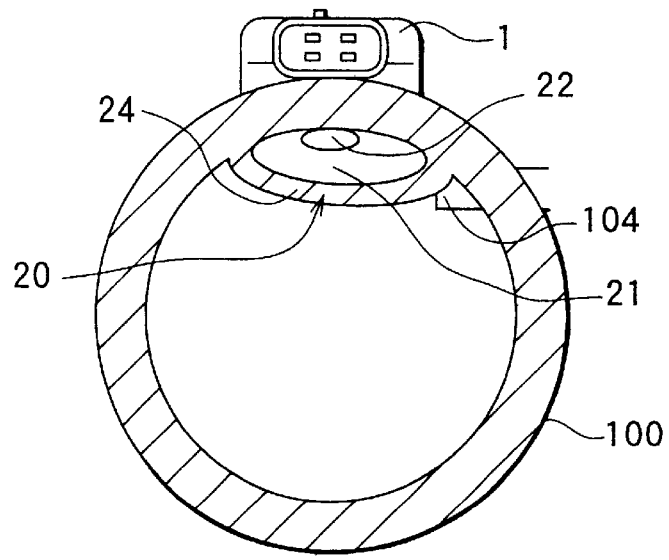
FIG. 2 is a cross sectional view of a modification of a throttle passage of FIG. 1B.

Next, a modification of the throttle passage 20 according to the first embodiment is described with reference to FIG. 2. The gas flow cross sectional area of the throttle passage 20 shown in FIG. 2 is formed in an elliptical shape, in place of a circular shape as shown in FIG. 1B. In the elliptical shaped throttle passage 20, a passage wall 24 is more expanded to enlarge the gas flow cross sectional area of the throttle passage 20 so that flow volume of the intake air for blowing off the dirty material may be more increased.

Though the above embodiment is described as an example of detecting the pressure of the intake surge tank 100 constituting the pipe member of intake system (intake manifold) for the internal combustion engine EN, the installation structure of the pressure detecting apparatus 1 for preventing the dirty material invasion due to the increased air flow speed according to the present embodiment is also applicable to a case of detecting the pressure of a pipe member of exhaust system (exhaust pipes) for the internal combustion engine EN.

Figure 3:
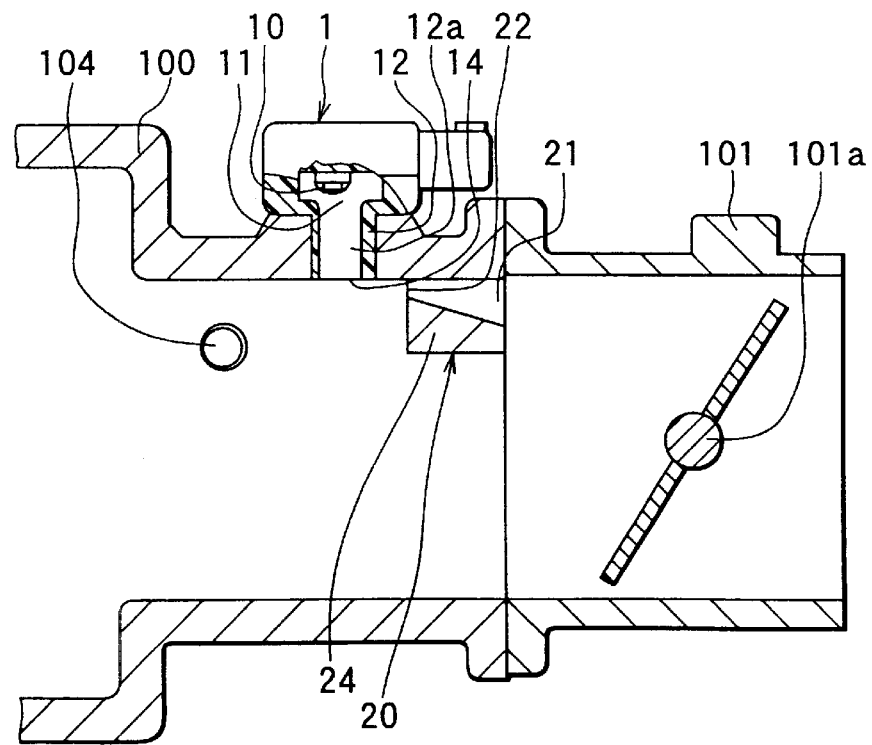
FIG. 3 is a cross sectional view of an installation structure of a pressure detecting apparatus according to a second embodiment of the present invention.

FIG. 3 shows a cross sectional view of an installation structure of a pressure detecting apparatus according to a second embodiment of the present invention. The second embodiment is a modification of the first embodiment. The passage wall 24 of the throttle passage 20 only extends from the entrance 21 to the throttle 22 and the throttle 22 commonly constitutes the exit, as shown in FIG. 3. The pressure inlet 14 for introducing the pressure positions in a vicinity of the throttle 22 at a downstream side of the intake air and the air flow speed just before the pressure inlet 14 may be increased. As a result, the second embodiment has a same functional effect as the first embodiment, having an advantage of a more compact structure for manufacturing.

Figure 4:
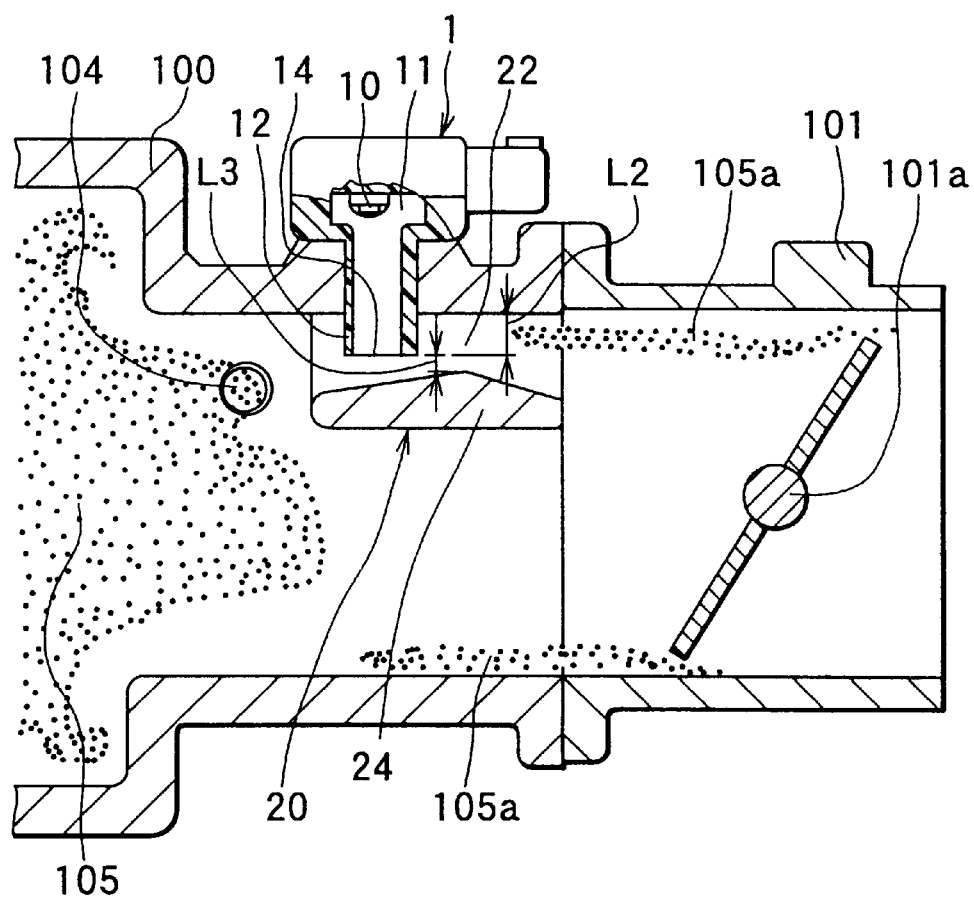
FIG. 4 is a cross sectional view of an installation structure of a pressure detecting apparatus according to a third embodiment of the present invention.

FIG. 4 is a cross sectional view of an installation structure of a pressure detecting apparatus according to a third embodiment of the present invention. The third embodiment is another modification of the first embodiment. The pressure introducing pipe 12 of the pressure detecting apparatus 1 has a projecting portion protruding from an inner wall of the throttle passage 20 into an inside of the throttle passage 20 to position the pressure inlet 14 into the inside of the throttle passage 20. Preferably a length L2 of the projecting portion is 3 mm to 15 mm and a gap L3 between the pressure inlet 14 and the throttle 22 in a protruding direction of the pressure introducing pipe 12 into the throttle passage 20 is 1 mm to 5 mm in view of the compact installation structure which can effectively prevent the dirty material invasion due to the increased air flow speed.

According to the third embodiment, in addition to the same functional effect as the first embodiment, the dirty material to be transferred along the inner wall of the throttle passage 20 is unlikely to be entered into the pressure inlet 14. Dirty gas 105a transferred along the inner wall, though the dirty gas 105a to be invaded from an upstream side of the throttle valve 101a is generally a few, may be prevented from entering into the pressure inlet 14 because of the projecting portion of the pressure introducing pipe 12.

The installation structure of the pressure detecting apparatus shown in FIG. 4, even if the throttle passage 20 is not provided in the intake surge tank 100 and the pressure introducing pipe 12 protrude directly into the inside of the intake surge tank 100, serves to prevent the invasion of the dirty material to a certain extent. This installation structure without the throttle passage 20 is useful, when it is rather difficult to provide the throttle passage in the intake surge tank 100 as its nature.

FIGS. 5A to 7B show various installation structures of pressure detecting apparatuses according to fourth embodiment of the present invention. According to the fourth embodiment, the throttle passage 20 is not provided in the intake surge tank 100. The pressure introducing pipe 12 protrudes directly into the inside of the intake surge tank 100 and the pressure inlet 14 is opened toward a downstream of the gas flow. Further, the pressure introducing pipe 12 and/or the pressure inlet 14 is formed in such a shape that the invasion of the dirty material into the pressure introducing pipe 12 of the pressure detecting apparatus 1 may be effectively limited.

Figure 5A:
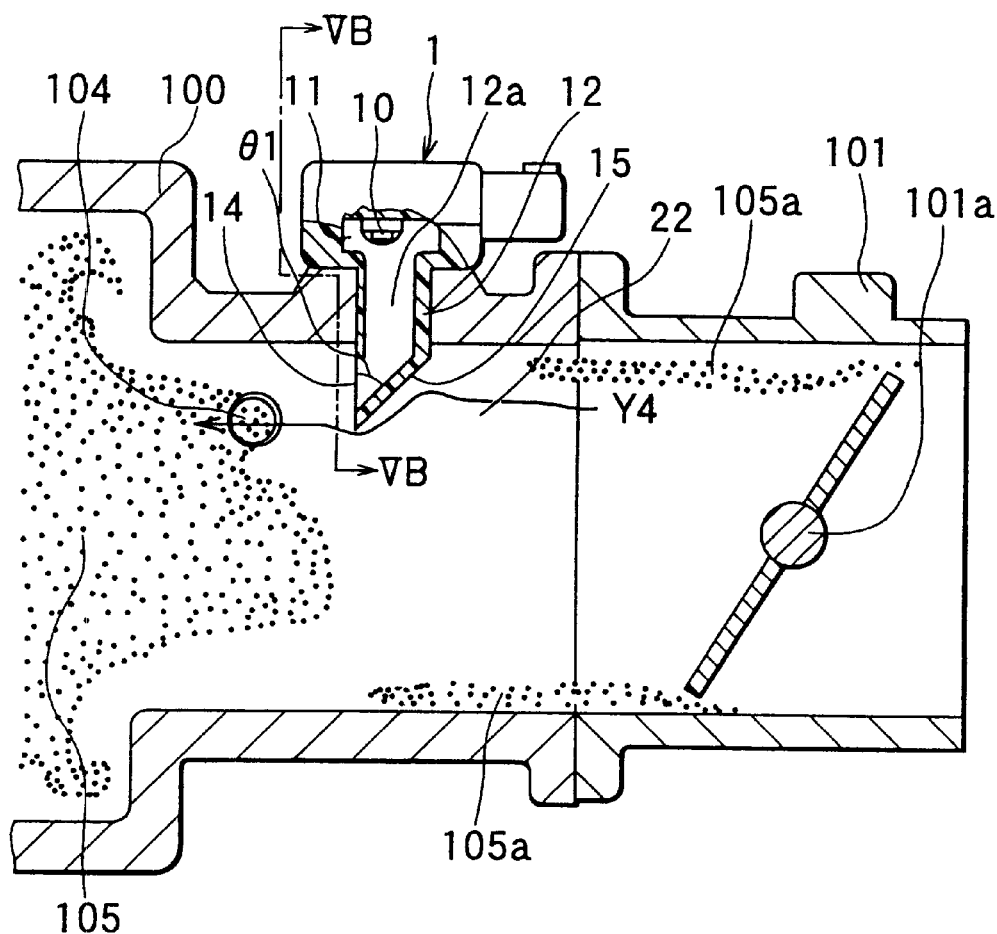
FIG. 5A is a cross sectional view of a first installation structure of a pressure detecting apparatus according to a fourth embodiment of the present invention.
Figure 5B:
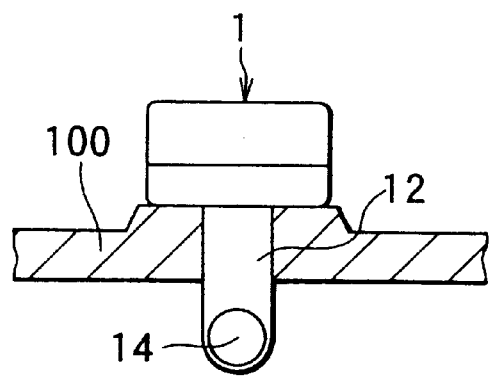
FIG. 5B is a cross sectional part view taken along a line VB—VB of FIG. 5A.

As a first example, a cross sectional view of an installation structure of a pressure detecting apparatus is shown in FIG. 5A. FIG. 5B shows a cross sectional part view taken along a line VB—VB of FIG. 5A. A projecting portion on an upstream side of the intake air flow, which protrudes into an inside of the intake surge tank 100, is provided with a tapered portion 15 inclined by a predetermined angle θ 1 (preferably, 10° to 70°) with respect to an protruding direction of the pressure introducing pipe 12 into the intake surge tank 100. The pressure inlet 14 is opened toward a downstream of the intake air flow, as shown in FIGS. 5A and 5B.

According to the first example, even if the dirty gas 105a is transferred from a side of the throttle valve 101a, the dirty gas 105a is unlikely to enter into the pressure inlet 14, since the dirty gas 105a is repelled around the tapered portion 15 of the pressure introducing pipe 12, as shown by an arrow Y4 of FIG. 5A.

Figure 6A:
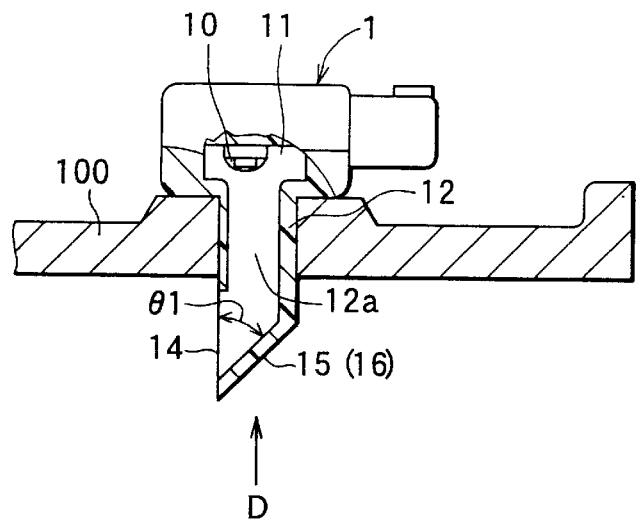
FIG. 6A is a cross sectional part view of a second installation structure of a pressure detecting apparatus according to the fourth embodiment of the present invention.
Figure 6B:
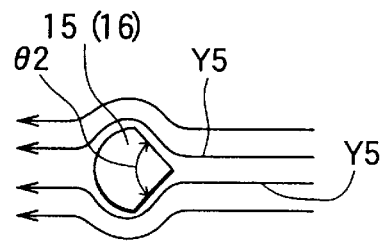
FIG. 6B is a view of a pressure introducing pipe as viewed from an arrow D of FIG. 6A.

As a second example of the fourth embodiment, a cross sectional part view of an installation structure of a pressure detecting apparatus is shown in FIG. 6A. FIG. 6B shows a view of a pressure introducing pipe as viewed from an arrow D of FIG. 6A.

According to the second example, in addition to the θ 1 tapered portion 15 shown in the first example, the projecting portion 15 on an upstream side of the intake air flow is shaped convex to constitute an acute angle portion 16 having an angle θ 2 of 10° to 70° in a cross section thereof (horizontal surface in this example) perpendicular to the protruding direction of the pressure introducing pipe 12 into the intake surge tank 100. The intake air is also repelled in a face direction (horizontal surface in this example) perpendicular to the protruding direction of the pressure introducing pipe 12 into the intake surge tank 100 as shown by an arrow Y5 of FIG. 6B.

With the structure mentioned above, the dirty gas 105a is more unlikely to enter into the pressure inlet 14, compared with the structure of the first example.

Figure 7A:
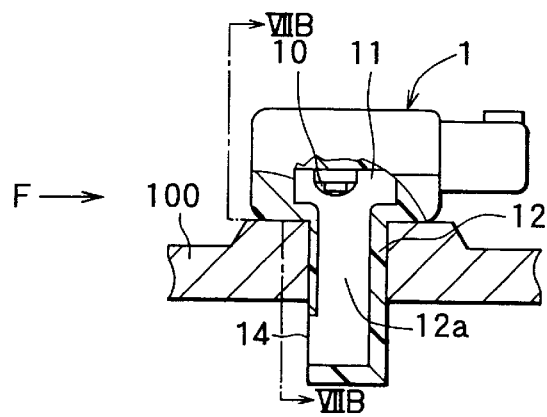
FIG. 7A is a cross sectional part view of a third installation structure of a pressure detecting apparatus according to the fourth embodiment of the present invention.
Figure 7B:
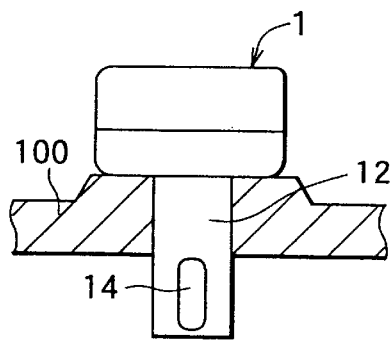
FIG. 7B is a cross sectional part view taken along a line VIIB—VIIB of FIG. 7A.

As a third example, a cross sectional part view of an installation structure of a pressure detecting apparatus is shown in FIG. 7A. FIG. 7B shows a cross sectional part view taken along a line VIIB—VIIB of FIG. 7A. The pressure introducing pipe 12 has a projecting portion partly protruding into an inside of the intake surge tank 100 to open the pressure inlet 14 toward a downstream of the intake air flow. The pressure inlet 14 is formed not in a round shape but in a slit shape long narrow along a protruding direction of the pressure introducing pipe 12 into the intake surge tank 100 so that the intake air skirted around the pressure introducing pipe 12 may be more effectively prevented from invading into the pressure inlet 14.

Figure 8:
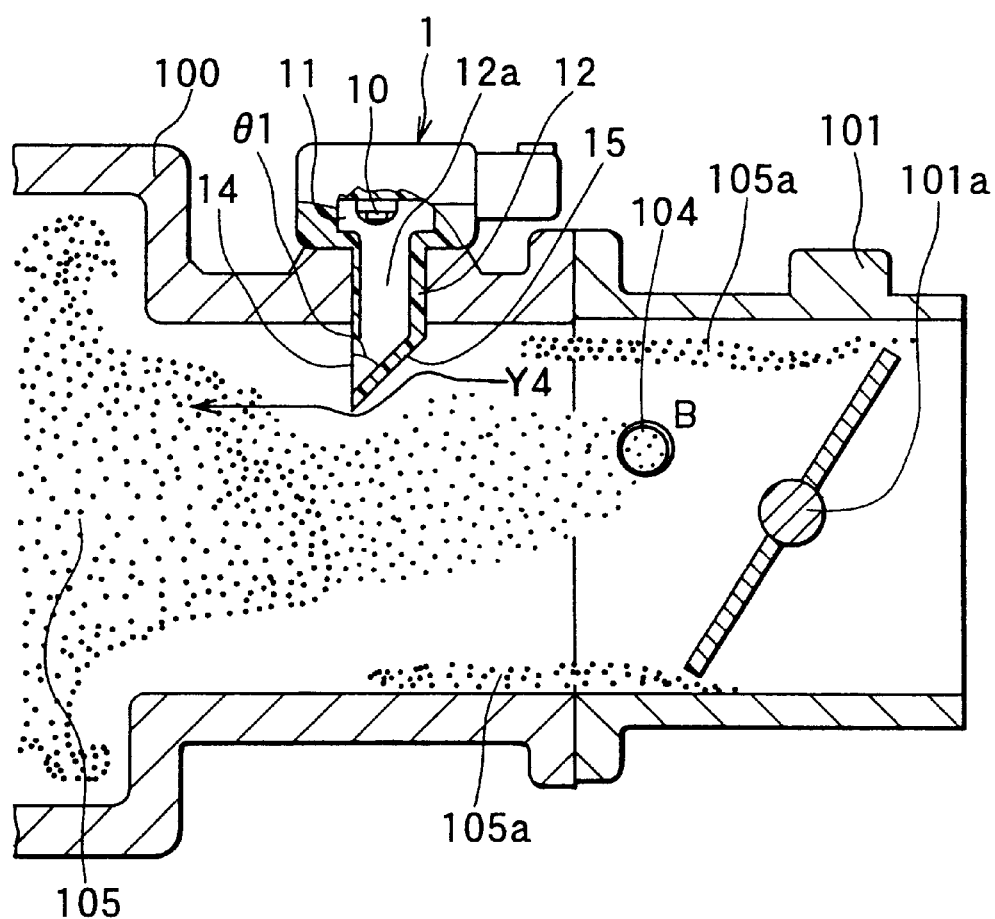
FIG. 8 is a cross sectional view of an alternative installation structure of a pressure detecting apparatus according to the fourth embodiment of the present invention.

The pressure introducing pipe 12 according to the fourth embodiment may be opened to the intake surge tank 100 on a side opposite to the throttle valve 101a with respect to the blow-by gas introducing pipe 104 or the EGR valve, as shown in FIG. 8. In this case, the pressure introducing pipe 12 as shown in the first and third examples also serves to prevent the dirty material from entering into the pressure inlet 14.

To prove the effect of the pressure inlet 14 opened toward the downstream of the intake air and the θ 1 (for example, 45°) tapered portion 15 of the pressure introducing pipe 12, an experimental test for comparing the installation structure according to the first example of the fourth embodiment as shown in FIGS. 5A and 5B with the installation structure not having the throttle passage 20 according to the third embodiment as shown in FIG. 4 was conducted.

Each of the pressure detecting apparatuses 1 of the respective structures was installed on the intake surge tank 100 of a four cylinders-direct injection 2200cc engine and powder was supplied to the intake surge tank 100 according to opening and closing of the throttle valve 101a. When the throttle valve 101a is fully opened to hold the engine revolution at 2000 rpm, the powder was supplied. And, when the throttle valve 101a is closed, the supply of the powder was interrupted. The opening and closing of the throttle valve 101a was repeated alternately with 10 seconds intervals for 3 times as one cycle. After completing 20 cycles, an amount of the powder entered into the pressure detecting apparatus was investigated. The investigation result showed that the invasion amount of the powder of the fourth embodiment is about ¹⁄₁₀ of that of the third embodiment.

Next, to prove an effect of a cross sectional shape of the projecting portion of the pressure introducing pipe 12, a simulation test was conducted on the pressure detecting apparatuses 1 having simplified models shown in FIGS. 9A to 11C. The simulation test is for investigating how each model effectively repels the intake air to make the air flow smooth.

Figure 9A:
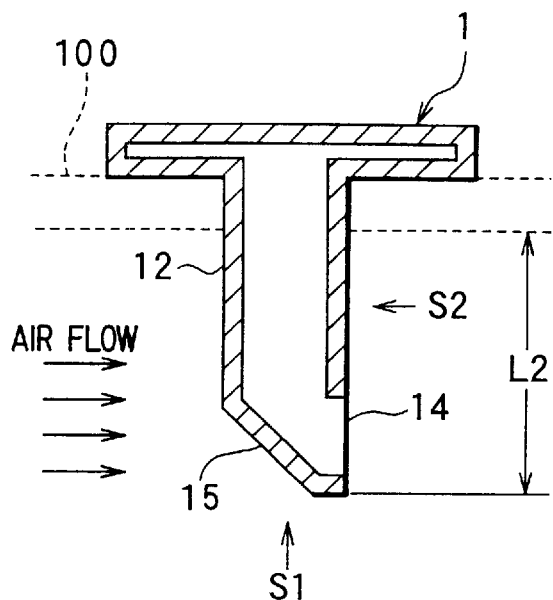
FIG. 9A is a cross sectional view of a base model pressure introducing pipe according to the fourth embodiment for a simulation test.
Figure 9C:
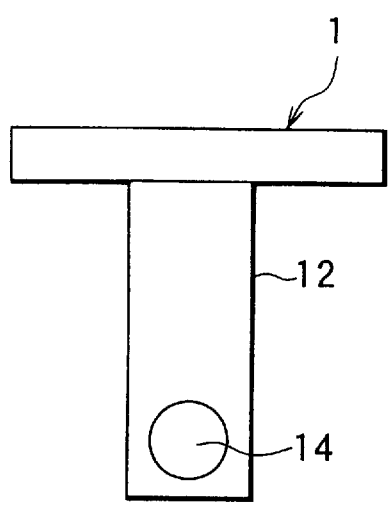
FIG. 9C is a view of the pressure introducing pipe as viewed from an arrow S2 of FIG. 9A.
Figure 9B:
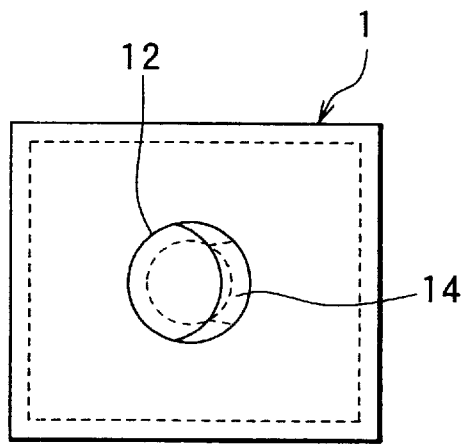
FIG. 9B is a view of the pressure introducing pipe as viewed from an arrow Si of FIG. 9A.
Figure 10A:
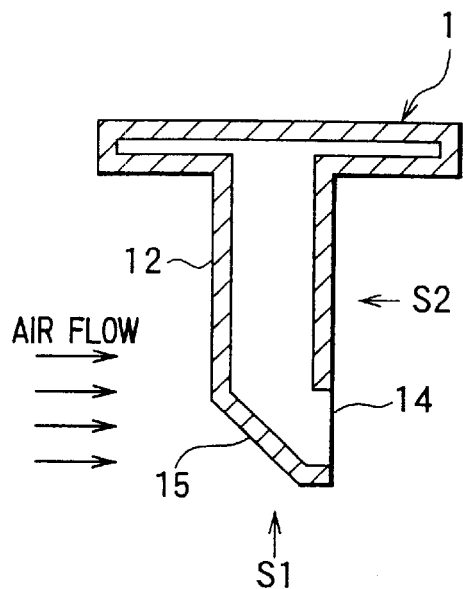
FIG. 10A is a cross sectional view of an elliptical model pressure introducing pipe according to the fourth embodiment for a simulation test.
Figure 10C:
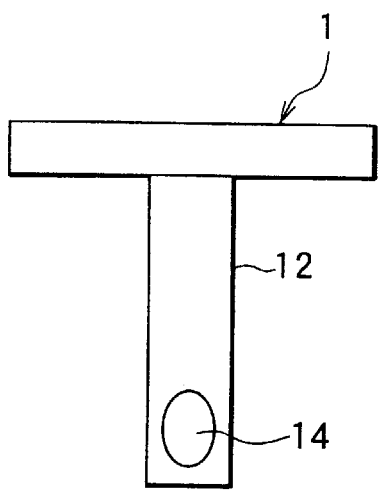
FIG. 10C is a view of the pressure introducing pipe as viewed from an arrow S2 of FIG. 10A.
Figure 10B:
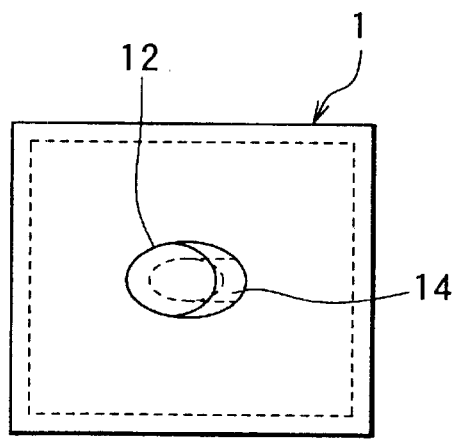
FIG. 10B is a view of the pressure introducing pipe as viewed from an arrow S1 of FIG. 10A.
Figure 11A:
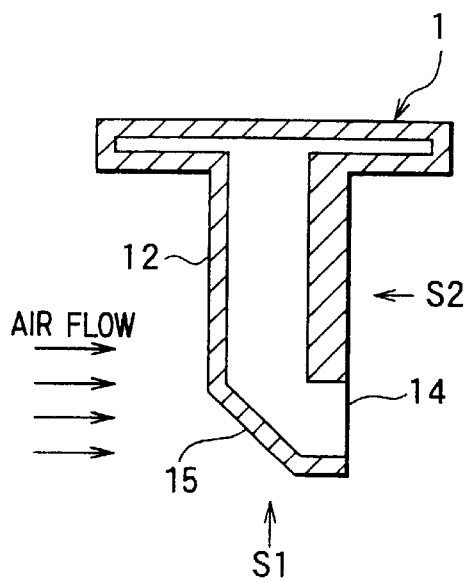
FIG. 11A is a cross sectional view of a streamlined model pressure introducing pipe according to the fourth embodiment for a simulation test.
Figure 11C:
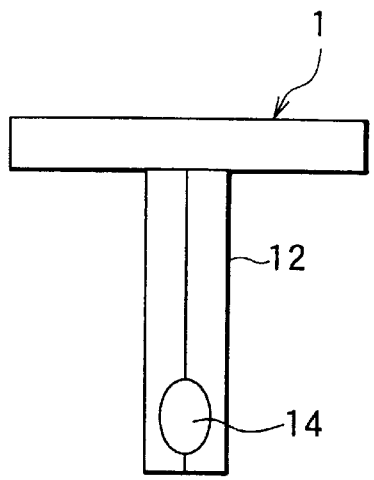
FIG. 11C is a view of the pressure introducing pipe as viewed from an arrow S2 of FIG. 11A.
Figure 11B:
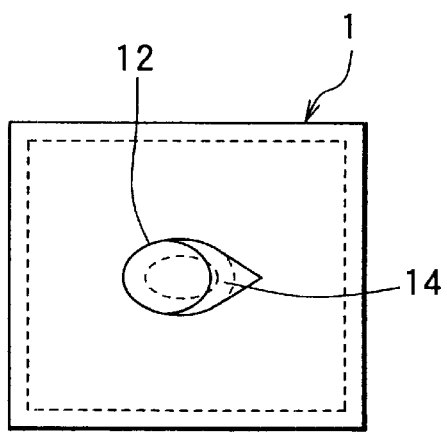
FIG. 11B is a view of the pressure introducing pipe as viewed from an arrow S1 of FIG. 11A.

FIG. 9A, 10A or 11A is a cross sectional view of a pressure introducing pipe 12 according to the first example of the fourth embodiment. FIG. 9B, 10B or 11B is a view from an arrow S1 of FIG. 9A, 10A or 11A. FIG. 9C, 10C or 11C is a view from an arrow S2 of FIG. 9A, 10A or 11A.

FIGS. 9A to 9C show a base model pressure introducing pipe 12 having a circular cross section of the projecting portion perpendicular to the protruding direction of the pressure introducing pipe 12 into the intake surge tank 100. FIGS. 10A to 10C show an elliptical model pressure introducing pipe 12 whose cross section of the projecting portion perpendicular to the protruding direction of the pressure introducing pipe 12 into the intake surge tank 100 is formed in a shape of an ellipse having a long axis in a flow direction of the intake air. FIGS. 11A to 11C show a streamlined model pressure introducing pipe 12 whose cross section of the projecting portion perpendicular to the protruding direction of the pressure introducing pipe 12 into the intake surge tank 100 is formed in a streamlined (wing) shape whose area is narrower on a downstream side of the intake air flow.

A length L2 of each projecting portion as shown in FIG. 9A is 10 mm and an air flow speed is 60 m/s when the engine revolution is 2000 rpm at 2200 cc engine, the intake manifold pressure is 48 kPa and the throttle valve is opened by 5° degrees.

The simulation test was also conducted on the basic, elliptical or streamlined model pressure introducing pipe 12 without the θ 1 tapered portion 15.

Figure 12A:
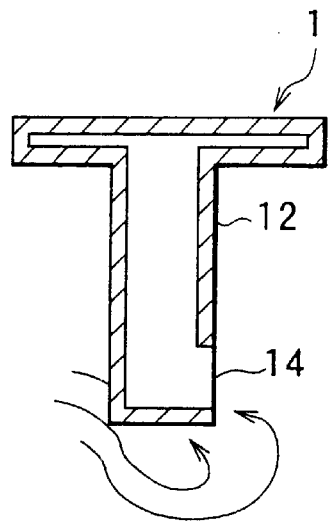
FIG. 12A is a view of gas flow as a simulation test result on the pressure introducing pipe without a tapered portion.
Figure 12B:
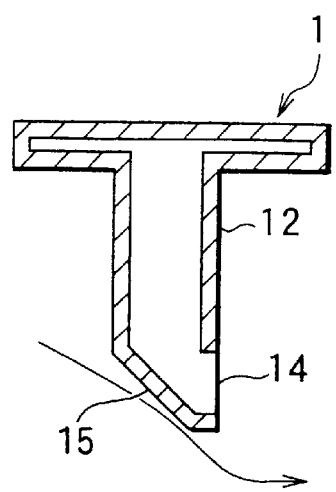
FIG. 12B is a view of gas flow as a simulation test result on the pressure introducing pipe with a tapered portion.

The simulation test results are shown in FIGS. 12A to 12E, which illustrate how the air flows toward the pressure inlet 14 at a downstream of the air after the air hits the projecting portion. FIG. 12A shows how the air flows under the pressure introducing pipe without the tapered portion 15 and FIG. 12B shows how the air flows under the pressure introducing pipe with a tapered portion 15. This simulation test result shows that the θ 1 tapered portion 15 serves to make the air more smoothly flow.

Figure 12C:
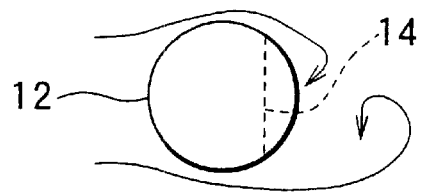
FIG. 12C is a view of gas flow as a simulation test result on the base model pressure introducing pipe.
Figure 12D:
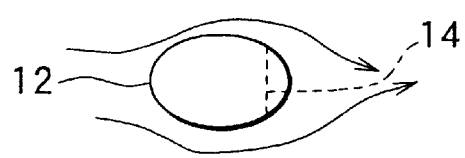
FIG. 12D is a view of gas flow as a simulation test result on the elliptical model pressure introducing pipe.
Figure 12E:
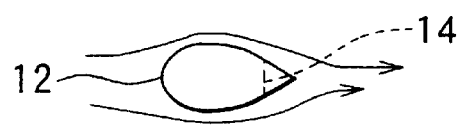
FIG. 12E is a view of gas flow as a simulation test result on the streamlined model pressure introducing pipe.

Further, with respect to the air flow perpendicular to the protruding direction of the pressure introducing pipe 12 into the intake surge tank 100, the simulation test results of the various model pressure introducing pipes 12 with the θ1 tapered portion 15 or without the θ1 tapered portion 15 are shown in FIGS. 12C, 12D and 12E. According to the test results, in view of less swirl of the air flowing toward the pressure inlet 14, the streamlined model shown in FIG. 12 E is the best, and the elliptical model shown in FIG. 12D and the basic model shown in FIG. 12C follow in order.

As mentioned above, the elliptical model makes the air flow more smoothly so that the invasion of dirty material into the pressure inlet may be more effectively limited, compared with the basic model. The streamlined model makes the air flow much more smoothly so that the invasion of dirty material into the pressure inlet may be much more effectively limited, compared with the elliptical model.

If the streamlined model pressure introducing pipe 12 has the θ 1 tapered portion 15, the air may be most effectively repelled around the projecting portion thereof so that dirty material is most unlikely to enter into the pressure inlet 14.

Though the pressure introducing pipe 12 according to the fourth embodiment is protruded directly to the intake surge tank 100 not having the throttle passage 20, the various shaped pressure introducing pipe 12 may be protruded into the intake surge tank 100 having the throttle passage 20 and in the vicinity of the throttle 22 as shown in the second embodiment or protruded into the throttle passage 20 provided in the intake surge tank 100 and in the vicinity of the throttle 22 as shown in the first and third embodiments.

Figure 13A:
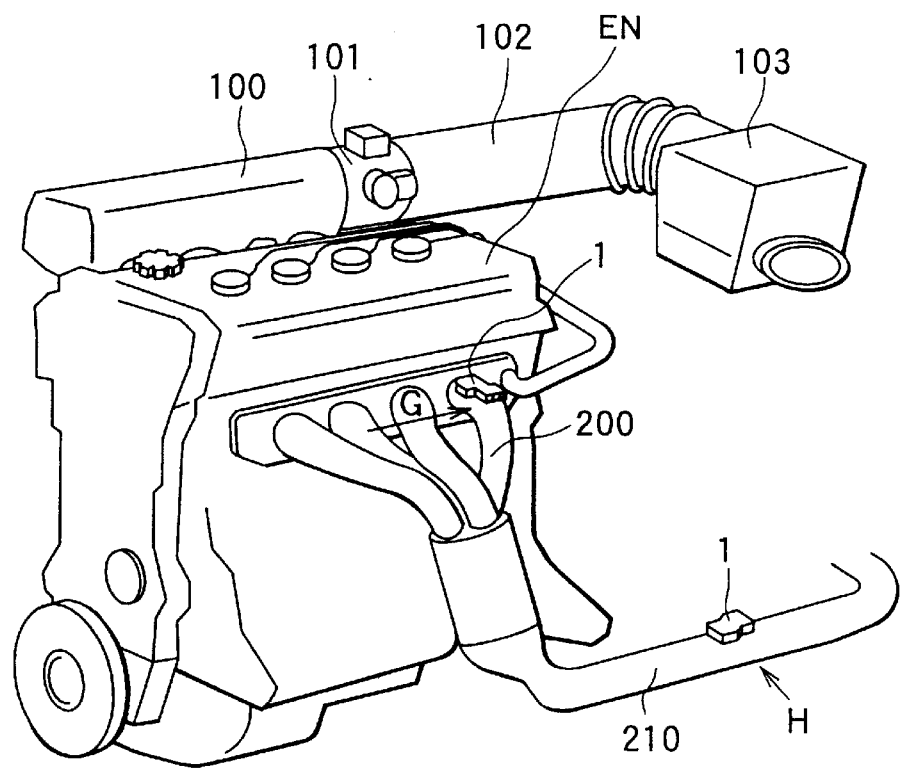
FIG. 13A is a perspective view of a pressure detecting apparatus according to a fifth embodiment.
Figure 13B:
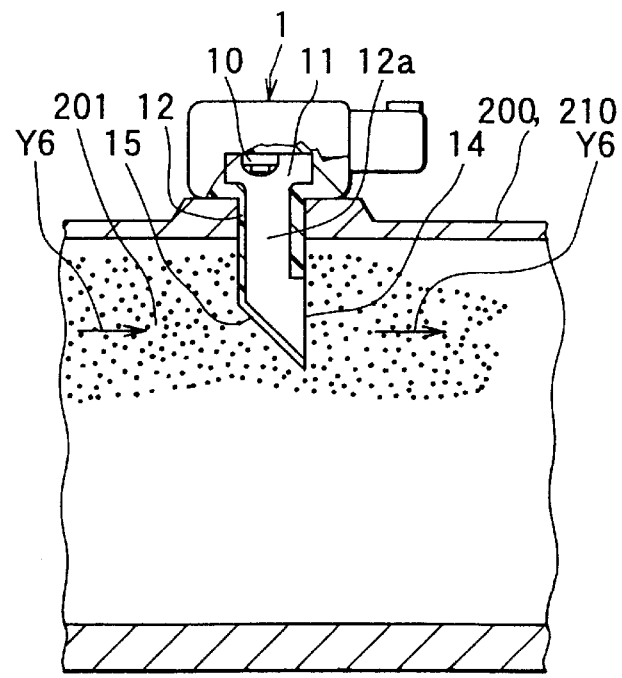
FIG. 13B is a cross sectional view of the pressure detecting apparatus viewed from an arrow G or H of FIG. 12A.

FIGS. 13A and 13B show a fifth embodiment of the present invention. According to the fifth embodiment, the pressure detecting apparatus 1 shown in the fourth embodiment detects pressure in an exhaust pipe (for example, made of metal such as stainless), that is, a pipe member constituting an exhaust system of an internal combustion engine. FIG. 13A is a perspective view of a pressure installed on the exhaust pipe. FIG. 13B is a cross sectional view of the pressure detecting apparatus viewed from an arrow G or H of FIG. 13A.

As shown in FIG. 13A, the pressure detecting apparatus 1 is installed airtightly on an exhaust pipe 200 provided near the internal combustion engine EN or on an exhaust pipe 210 provided far away from the internal combustion engine EN.

Exhaust gas flows in a direction shown by an arrow Y in the exhaust pipe 200 or 210. A pressure introducing pipe 12 of the pressure detecting apparatus 1 partly protrude from an inner wall of the exhaust pipe 200 or 210 and a pressure inlet 14 is opened toward a downstream of the exhaust gas flow (turns its back to the exhaust gas flow). The installation structure mentioned above serves to restrict an invasion of dirty material such as moisture and carbon contained in the exhaust gas 201 into the pressure inlet 14 so that the pressure inside the exhaust pipe 200 or 210 may be accurately detected. As a temperature of the exhaust gas 201 flowing in the exhaust pipe 210 on a downstream side of the exhaust gas is lower than that in the exhaust pipe 200 on an upstream side of the exhaust gas, it is preferred to install the pressure detecting apparatus 1 on the exhaust pipe 210 on the downstream side of the exhaust gas to avoid the overheating of the pressure detecting apparatus 1.

Figure 14:
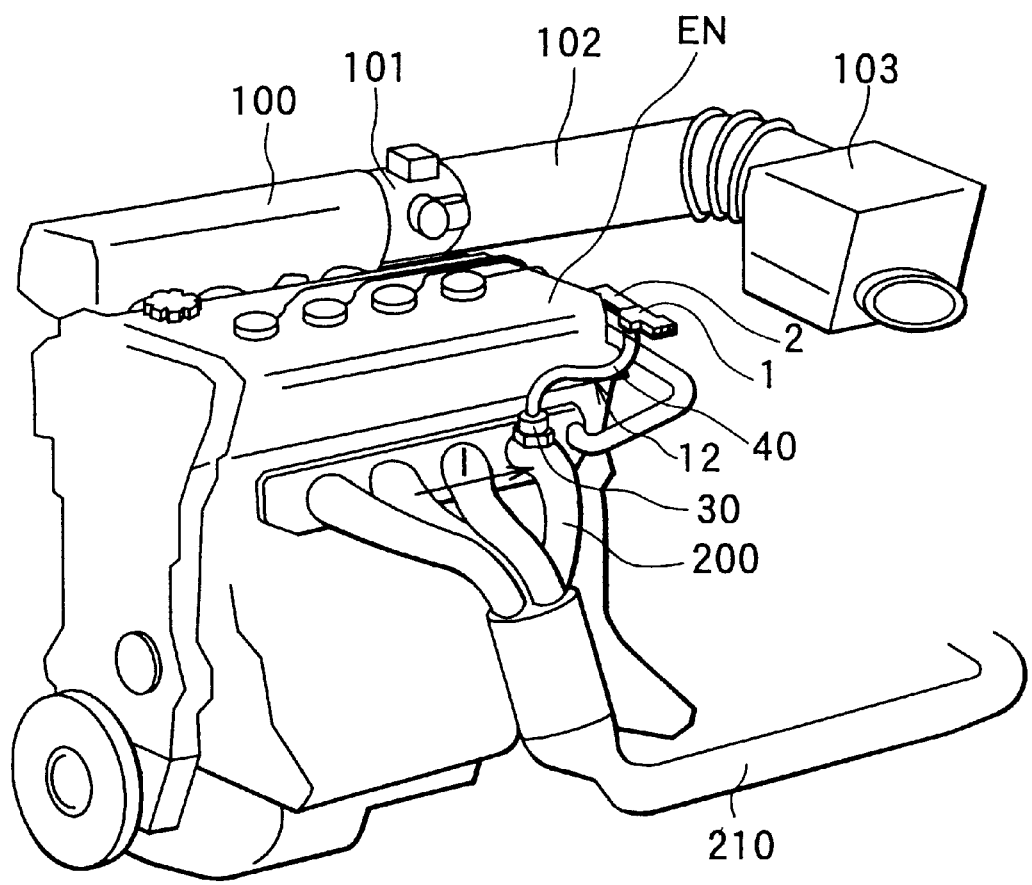
FIG. 14 is a perspective view of a pressure detecting apparatus according to a sixth embodiment.
Figure 15:
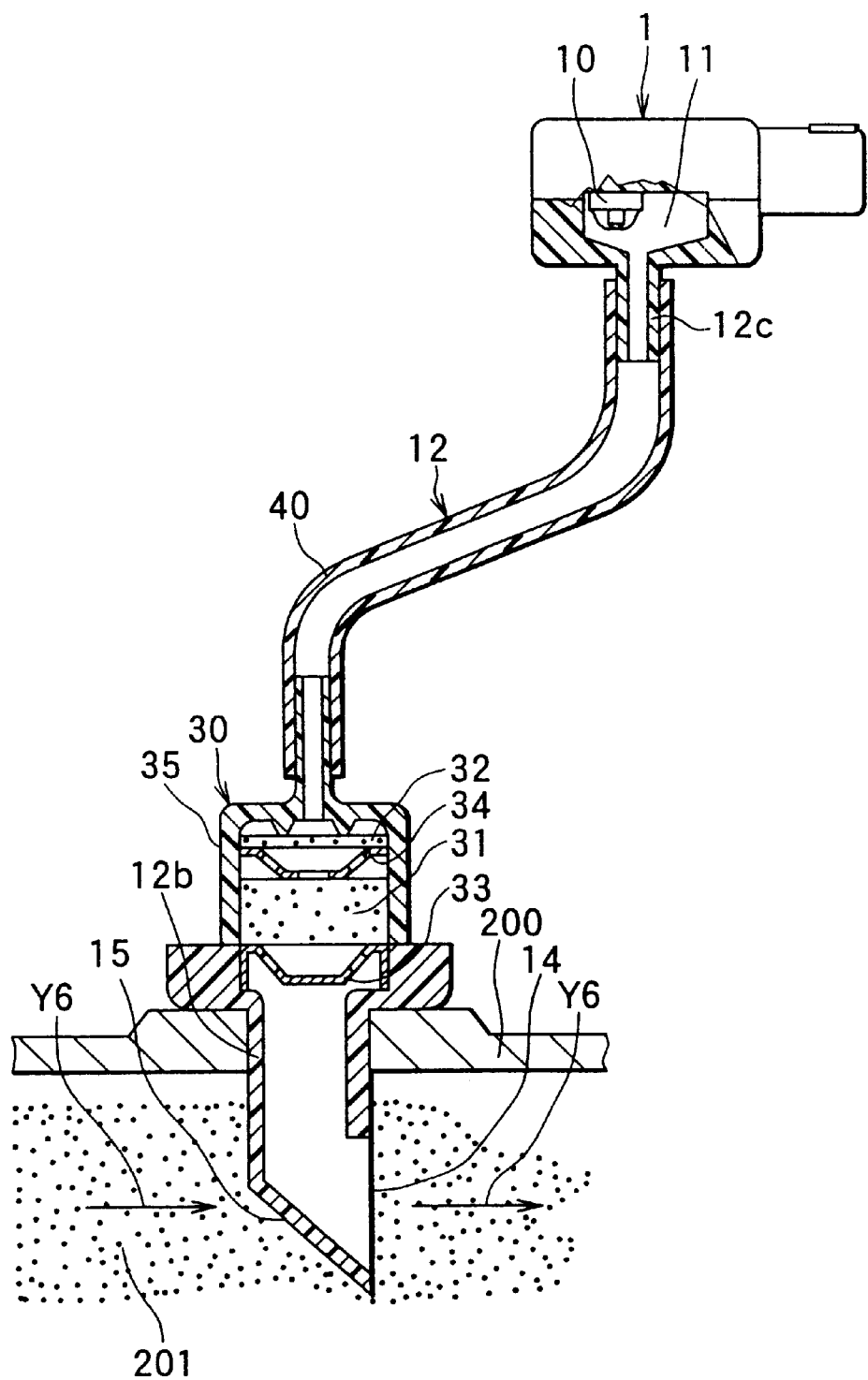
FIG. 15 is a cross sectional view of the pressure detecting apparatus viewed from an arrow I of FIG. 14.

FIG. 14 shows a perspective view of a pressure detecting apparatus according to a sixth embodiment. FIG. 15 is a cross sectional view of the pressure detecting apparatus viewed from an arrow I of FIG. 14. The sixth embodiment is a modification of the fifth embodiment in which a ventilating gas filter (filter element) is placed in an intermediate of the pressure introducing pipe 12.

As shown in FIG. 14, the pressure detecting apparatus 1 is installed on an internal combustion engine EN with a stay 2 such as an installation stick. The gas filter 30 and a hose 40 are arranged in a middle of the pressure introducing pipe 12 communicated with the exhaust pipe 200. As shown in FIG. 15, the gas filter 30 is provided with ventilating filter portions 31 to 34 and a housing 35 containing the filter portions 31 to 34.

The filter portions are a metal filter 31 and a cloth filter 32, which are piled up to each other, and fastening plates 33 and 34 each having a hole through which the exhaust gas passes, with which the metal and cloth filters 31 and 32 are fixed. the pressure introducing pipe 12 of the pressure detecting apparatus 1 is composed of a pressure introducing pipe 12b on side of the pressure inlet 14, the housing 35, the hose 40 and a pressure introducing pipe 12c on a side of the pressure chamber 11.

The structure according to the sixth embodiment has not only the same merit as mentioned in the fifth embodiment but also more enhanced effect for restricting the invasion of the dirty material due to the gas filter 30 which blocks carbon flown together with the exhaust gas 201 in a direction shown by an arrow Y6. Further, intervening the gas filter 30 serves to avoid the overheating of the pressure detecting apparatus 1.

Even if the gas filter 30 is not provided in the housing 35 and the housing 35 is empty in the structure shown in FIG. 15, the invasion of the dirty material may be prevented by the construction of the pressure introducing pipe 12 having the tapered portion 15 and the pressure inlet 14 opened toward a down stream of the exhaust gas flowing in a direction shown in the arrow Y6.

Figure 16A:
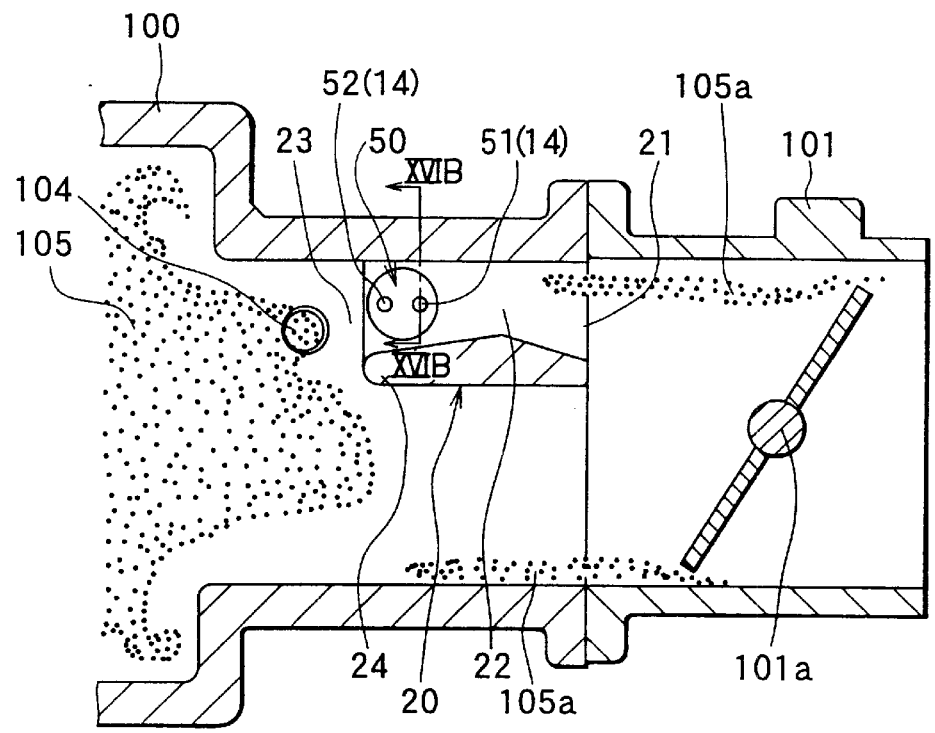
FIG. 16A is a cross sectional view of an installation structure of a pressure detecting apparatus according to a seventh embodiment of the present invention.
Figure 16B:
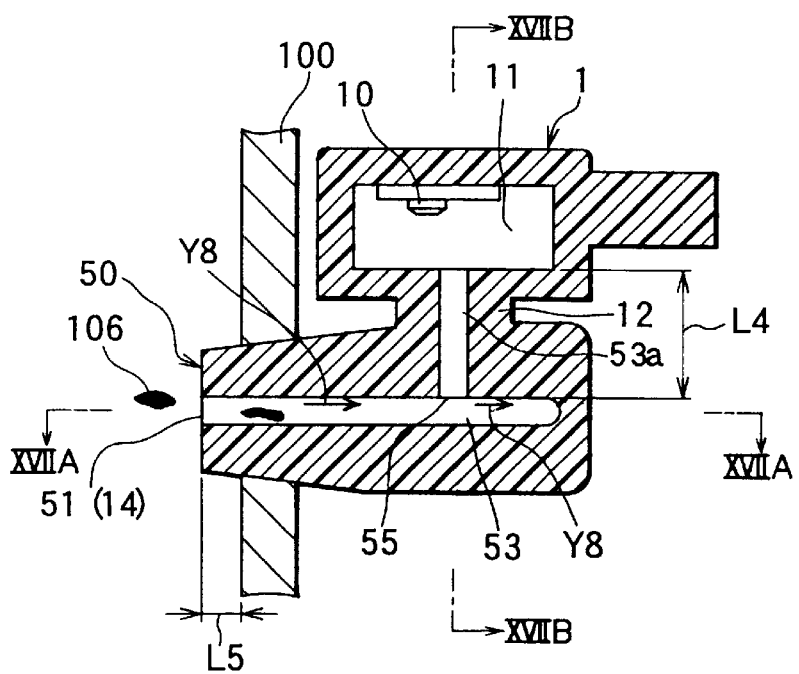
FIG. 16B is a cross sectional view taken along a line XVIB—XVIB of FIG. 16A.
Figure 17A:
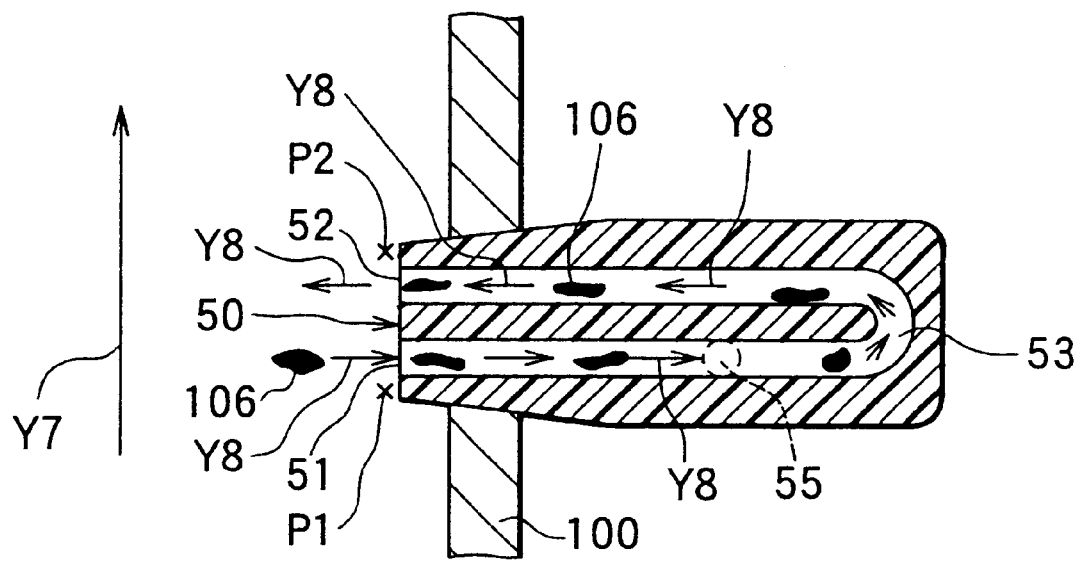
FIG. 17A is a cross sectional view taken along a line XVIIA—XVIIA of FIG. 16B.
Figure 17B:
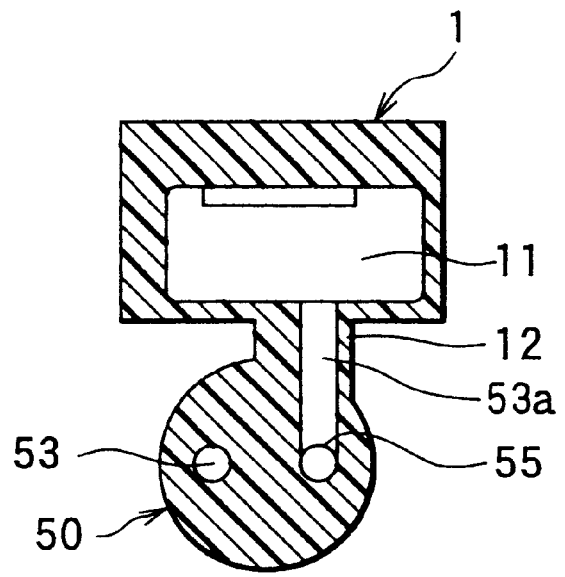
FIG. 17B is a cross sectional view taken along a line XVIIB—XVIIB of FIG. 16B.

FIGS. 16A to 17B shows an installation structure of a pressure detecting apparatus according to a seventh embodiment. FIG. 16A is across sectional view of the installation structure of the pressure detecting apparatus. FIG. 16B is a cross sectional view taken along a line XVIB—XVIB of FIG. 16A. FIG. 17A is a cross sectional view taken along a line XVIIA—XVIIA of FIG. 16B. FIG. 17B is a cross sectional view taken along a line XVIIB—XVIIB of FIG. 16B.

The seventh embodiment is a modification of the first embodiment. A pressure introducing pipe 12 is constituted by a communicating path 50 composed of a U shaped first passage 53 having an entrance 51 and an exit 52 each of which is communicated as the pressure inlet 14 with an inside of the intake surge tank 100 and a second passage 53a one end of which is communicated with a pressure chamber 11 and the other end of which is communicated with a portion 55 in a middle of the U shaped first passage 53. The pressure in the intake surge tank 100 is introduced from the entrance 51 or the exit 52 through the first and second passages 53 and 12a to the pressure chamber 11 of the pressure detecting apparatus 1 and detected by a detecting element 10. The pressure introducing pipe 12 or the communicating path 50 is made integrally by resin molding.

The entrance 50 and the exit 52 are provided at opposite ends of the U shaped first passage 53 and are opened to an inside of a throttle passage 20 provided in the intake surge tank 100, respectively, at positions away from each other. The communicating path 50 is airtightly connected to a wall of the intake surge tank 100.

At least, the entrance 51 is positioned in a vicinity of a throttle 22, similarly with the first embodiment, and the entrance 51 and the exit 52 are arranged in parallel with a flow direction of intake air flowing from a side of a throttle valve 101a. The entrance 51 and the exit 52 may be arranged perpendicularly to (up and down direction in FIG. 16A) the flow direction of intake air. Therefore, the invasion of the dirty material into the entrance 51 due to the throttle passage 20 can be limited, similarly with the first embodiment.

As there exists a pressure difference between the entrance 51 and the exit 52, a part of intake air is inhaled from the intake surge tank 100 through the entrance 51 and, then, passes through the first passage 53 and, finally, exhaled to the intake surge tank 100 through the exit 52. Therefore, even if the dirty material is entered from the entrance 50 into the first passage 53, the dirty material is exhaled from the exit 52 so that the dirty material is unlikely to enter into the pressure chamber where the pressure element 10 is mounted.

As shown in FIG. 17A, the intake air flows in a direction shown by an arrow Y7 in the intake surge tank 100. Due to the pressure difference between a position P1 at an upstream of the Y7 airflow and a position P2 at a downstream of the Y7 air flow, which occurs at the moment when the Y7 air flow abruptly starts and stops, air flows in a direction shown by an arrow Y8 in the communicating path 50. Therefore, even if dirty material 106 such as oil is invaded into the communicating path 50 from the entrance 51 with the air 105a on a side of the throttle valve 101a, the dirty material is got out from the exit 52 with the air 105a.

As mentioned above, the communicating path 50 is communicated with the pressure chamber 11 through the second passage 53a extending from the middle of the second passage 53 for detecting the pressure in the intake surge tank 100. However, the dirty material transferred along the second passage 53 and is unlikely to enter into the second passage 53a and the pressure chamber 11. As a result, the dirty material 106 is unlikely to adhere to an inside of the pressure chamber 11 so that pressure may be accurately detected.

It is preferred that the entrance 51 is positioned on an upstream side of the air flow caused by an operation of the internal combustion engine EN and the exit 52 is positioned on a downstream side thereof to produce a higher pressure difference between the entrance 51 and the exit 52, which is more effective for restricting the invasion of the dirty material.

Further, when the entrance 51 and the exit 52 are positioned laterally in the up and down direction as mentioned before, it is preferable to arrange the position 55, to which the second passage 53a is connected, at an upper side passage of the U shaped first passage 53, since the dirty material is likely to stagnate at a lower side passage of the U shaped first passage 53 due to gravity and enter into the pressure chamber 11.

To optimize the restriction of the dirty material invasion, it is preferable that air flow cross sectional area of the communicating path 50 is within a range of 5 to 320 mm$^2$. An air flow cross sectional area of the entrance 51 is, preferably, equal to or less than that of the exit 52. When the air flow cross sectional area of the exit 52 is less that that of the entrance 51, the dirty material 106 entered from the entrance 51, as shown in FIG. 17A, causes a reflecting pressure at the exit 52 so that the dirty material is pulled back in the first passage 53 without being get out from the exit 52.

A length of the first passage 53 is, preferably, within 5 to 100 mm. Further, it is preferred that an air flow cross sectional area of the second passage 53a is within a range of 5 to 320 mm$^2$ and a length L4 (refer to FIG. 16B) of the second passage 53a is 1 to 100 mm. Furthermore, the air flow cross sectional area of the first passage 53 is always larger than that of the second passage 53a. As the second passage 53a is narrower, the invasion of the dirty material 106 into the pressure chamber 11 becomes less.

Moreover, to restrict the invasion of the dirty material into the first passage 53 transferred along the wall of the intake surge tank 100, it is preferred that the both end of the first passage 53 (the entrance 51 and the exit 52) protrudes into the inside of the intake surge tank 100 and a projecting length L5 is 1 to 15 mm, as shown in 16B.

Figure 18:
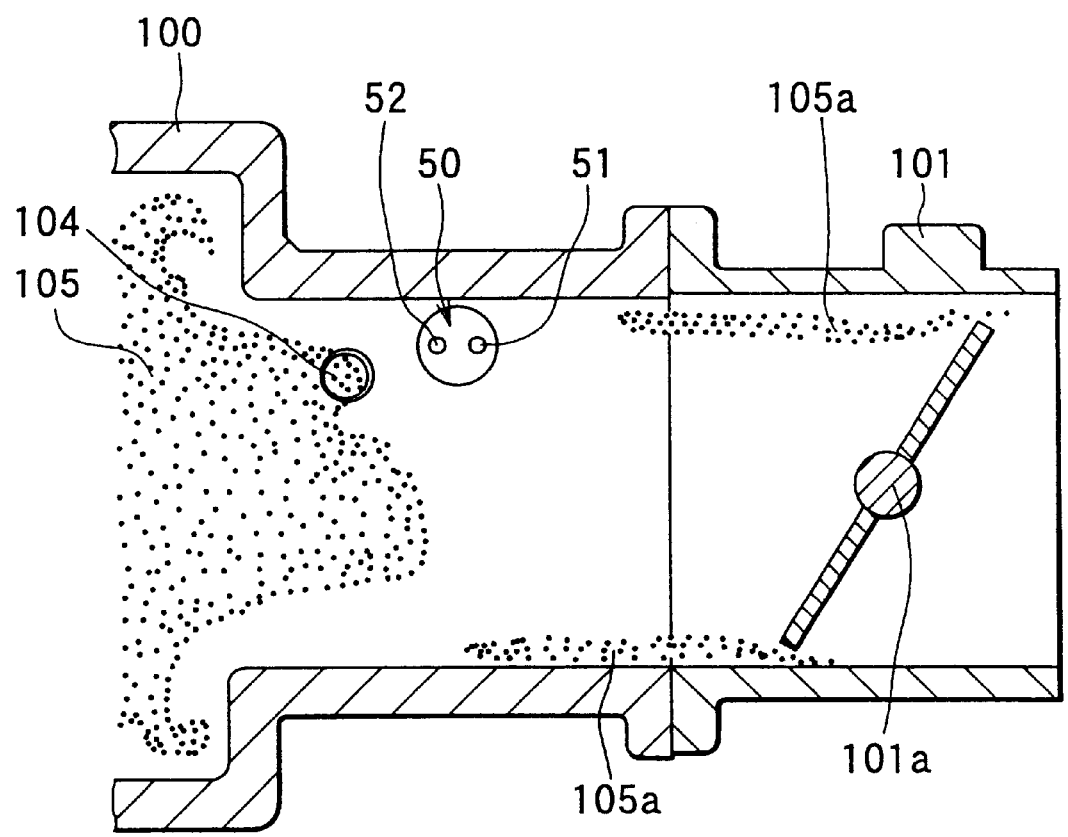
FIG. 18 is a cross sectional view of an installation structure of a pressure detecting apparatus according to an eighth embodiment of the present invention.

An eighth embodiment, which is a modification of the seventh embodiment, is shown in FIG. 18 according to the eighth embodiment, the throttle passage 20 is not provided in the intake surge tank 100 and the entrance 51 and the exit 52 are directly opened to the intake surge tank 100, not into the throttle passage 20. The pressure in the intake surge tank 100 is introduced to the pressure chamber 11 of the pressure detecting apparatus 1 through the communicating path 50 constituting the pressure introducing pipe 12 shown in FIGS. 16A to 17B. The cross section of the pressure detecting device 1 according to the eight embodiment is the same as shown in FIGS. 16B, 17A and 17B. According to the eight embodiment, a complicated apparatus and circuit separately provided for air flow control are not necessary. Further, without using the throttle passage 20, the invasion of the dirty material contained in the gas in the intake surge tank may be restricted.

In the pressure detecting apparatus 1 according the eight embodiment, it is also preferable that the entrance 51 is positioned on the upstream side of the air flow and the exit 52 is positioned on the downstream side thereof, as disclosed in the seventh embodiment, to induce the higher pressure difference between the entrance 51 and the exit 52. The preferable dimensional limitations shown in the seventh embodiment are also applicable to the eighth embodiment.

Figure 19A:
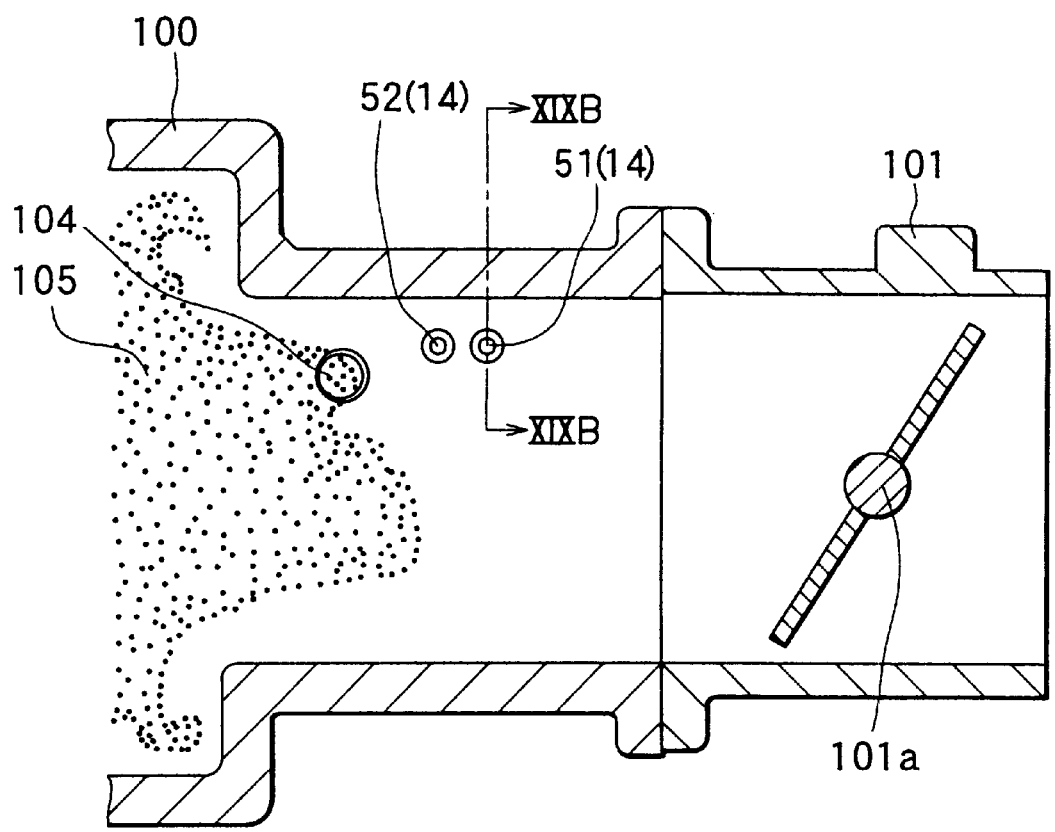
FIG. 19A is a cross sectional view of an installation structure of a pressure detecting apparatus according to an ninth embodiment of the present invention.
Figure 19B:
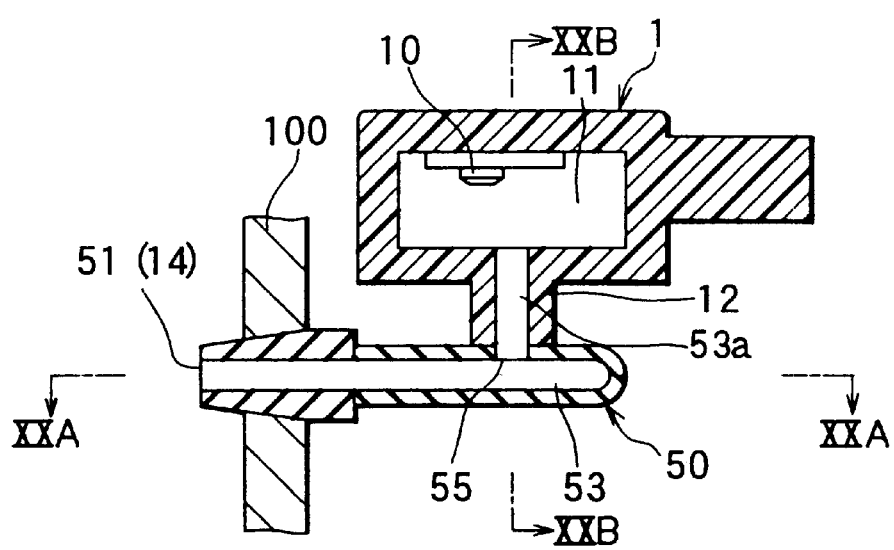
FIG. 19B is a cross sectional view taken along a line XIXB—XIXB of FIG. 19A.
Figure 20A:
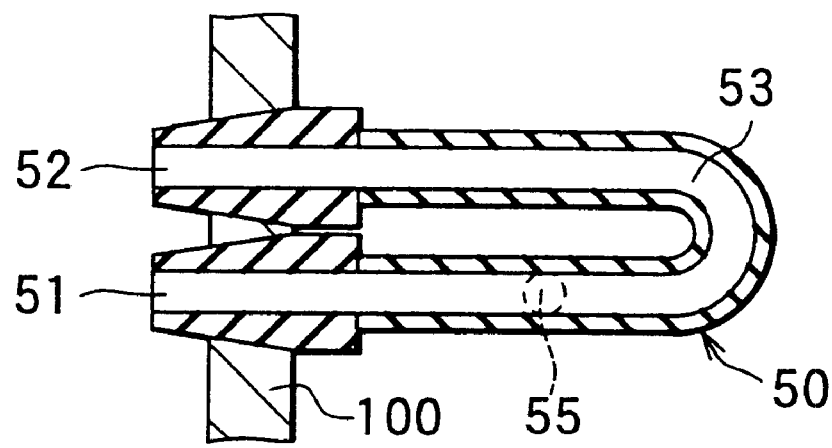
FIG. 20A is a cross sectional view taken along a line XXA—XXA of FIG. 19B.
Figure 20B:
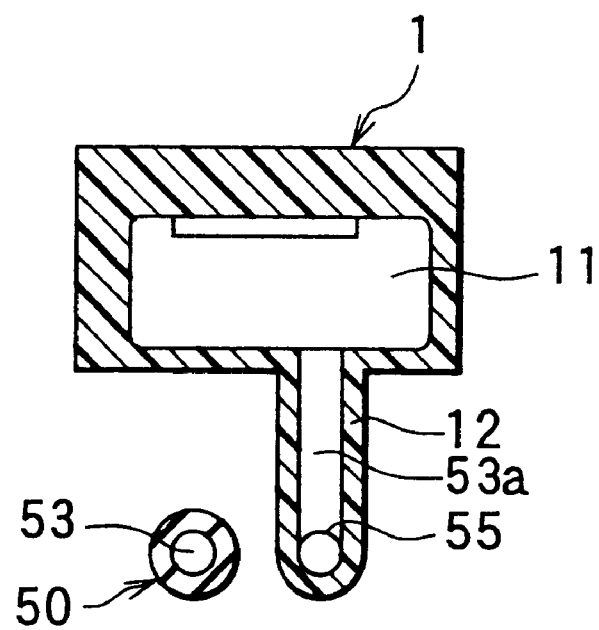
FIG. 20B is a cross sectional view taken along a line XXB—XXB of FIG. 19B.

FIGS. 19A to 20B show a ninth embodiment, which is a modification of the eight embodiment. According to the ninth embodiment, the U shaped first passage 53 is not formed by resin molding integrally with the second passage 53a but formed by a flexible rubber hose separately with the second passage 53a. FIG. 19A is a cross sectional view of an installation structure of a pressure detecting apparatus according to the ninth embodiment. FIG. 19B is a cross sectional view taken along a line XIXB—XIXB of FIG. 19A. FIG. 20A is a cross sectional view taken along a line XXA—XXA of FIG. 19B. FIG. 20B is a cross sectional view taken along a line XXB—XXB of FIG. 19B.

The pressure detecting apparatus according to the ninth embodiment is useful when the installation of the resin made communicating path 50 (the first passage 53) on the intake surge tank 100 is difficult or when the conventional pressure detecting apparatus not having the communicating path 50 is revised to add the same functional effect as the eight embodiment. The first passage 53 may be connected to the second passage 53a, for example, by a joint member (not shown).

Figure 21A:
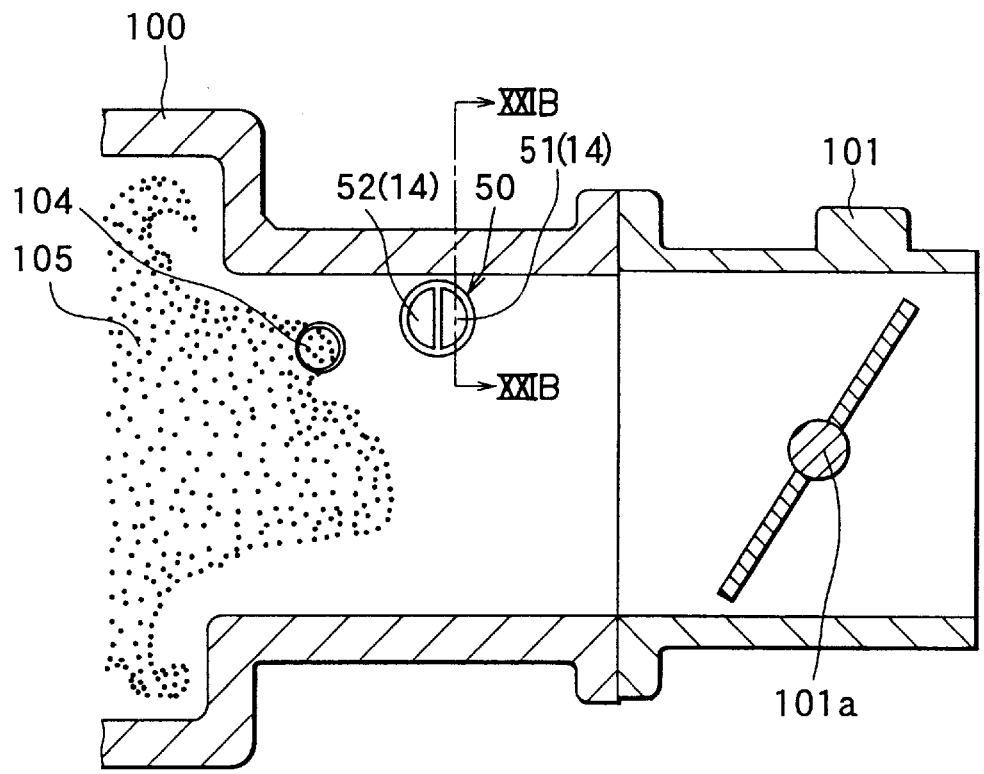
FIG. 21A is a cross sectional view of an installation structure of a pressure detecting apparatus according to a tenth embodiment of the present invention.
Figure 21B:
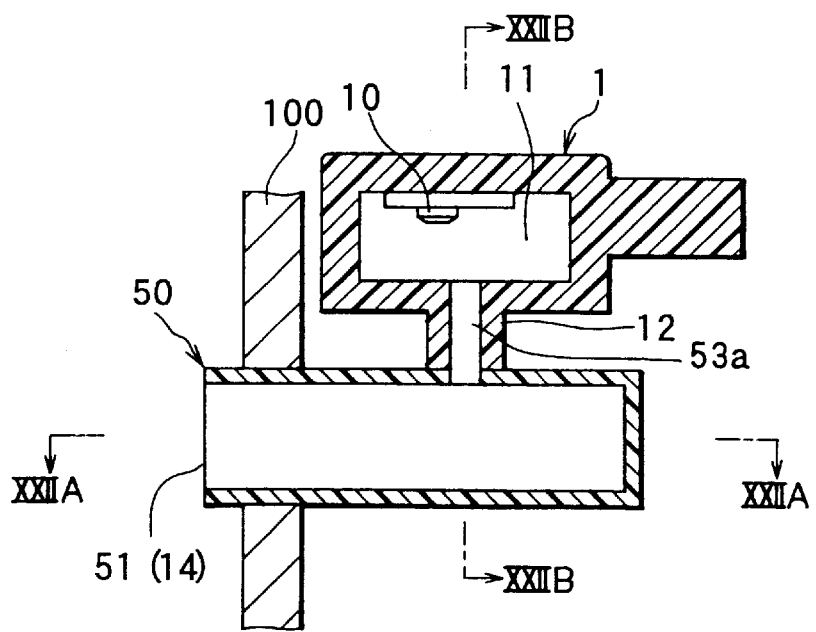
FIG. 21B is a cross sectional view taken along a line XXIB—XXIB of FIG. 21A.
Figure 22A:
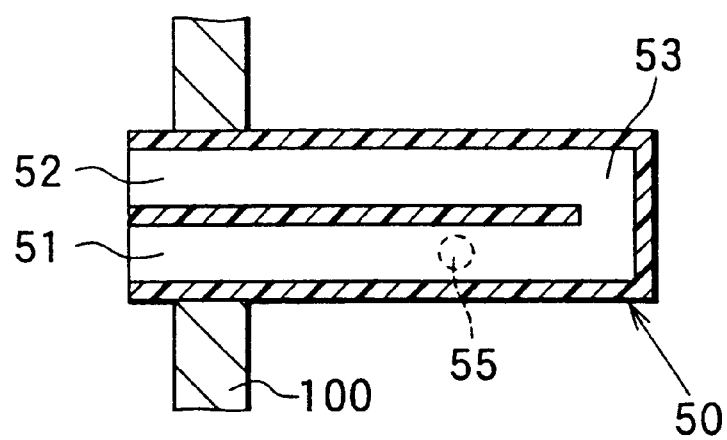
FIG. 22A is a cross sectional view taken along a line XXIIA—XXIIA of FIG. 21B.
Figure 22B:
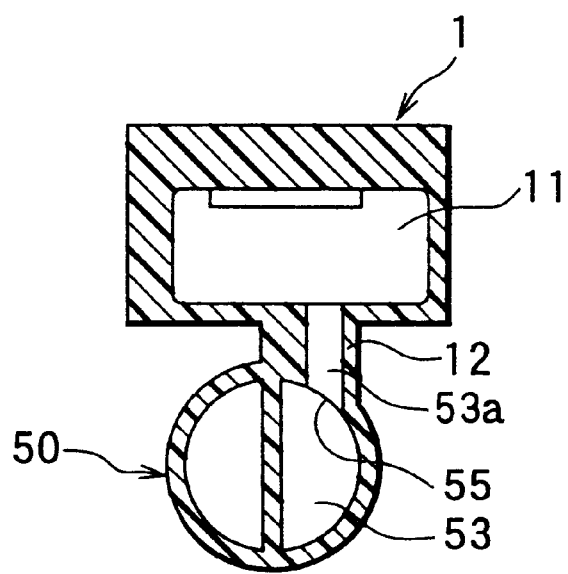
FIG. 22B is a cross sectional view taken along a line XXIIB—XXIIB of FIG. 21B.

FIGS. 21A to 22B show a tenth embodiment, which is another modification of the eighth embodiment. FIG. 21A is a cross sectional view of an installation structure of a pressure detecting apparatus. FIG. 21B is a cross sectional view taken along a line XXIB—XXIB of FIG. 21A. FIG. 22A is a cross sectional view taken along a line XXIIA—XXIIA of FIG. 21B. FIG. 22B is a cross sectional view taken along a line XXIIB—XXIIB of FIG. 21B.

According to the tenth embodiment, the first passage 53 of the communicating path 50 is constituted by a pipe, an inside of which is partitioned to form the U shaped passage. The tenth embodiment with more compact structure of the communicating path 50 has the same functional effect as the eighth embodiment.

The installation structure of the pressure detecting apparatus 1 according to the ninth or tenth embodiment may have the throttle passage 20 provided in the intake surge tank 100, as shown in the seventh embodiment.

Further, in the first to tenth embodiments, the installation structure of the pressure detecting apparatus 1 or the pressure detecting apparatus 1 itself is applicable not only to the intake surge tank 100 but also to the exhaust pipe 200 or 210. That is, the pressure detecting apparatus 1 according to the present invention may be installed on any pipe members constituting the intake and exhaust system for internal combustion engines.

What is claimed is:

1. An installation structure of a pressure detecting apparatus installed on a pipe member for an intake and exhaust system of an internal combustion engine, comprising:

a throttle valve for introducing gas into the pipe member, an amount of the introduced gas being variable according to an operation of the internal combustion engine;

a pressure introducing pipe having a pressure inlet and a pressure outlet, the pressure introducing pipe being connected on a side of the pressure inlet to the pipe member and on a side of the pressure outlet to the pressure detecting apparatus so that inner pressure in the pipe member may be introduced to and detected by the pressure detecting apparatus; and a throttle passage disposed in the pipe member downstream of the throttle valve for permitting a part of the introduced gas to bypass, the throttle passage being provided with an inner wall extending along a flow direction of the gas to constitute a throttle portion for increasing a flow speed of the bypassing gas, wherein the pressure inlet is positioned in a vicinity of the throttle portion.

2. An installation structure of a pressure detecting apparatus according to claim 1, wherein the pressure inlet is positioned on a downstream side of the gas flow with respect to the throttle portion.

3. An installation structure of a pressure detecting apparatus according to claim 2, wherein the pressure inlet is positioned 3 to 50 mm far away from the throttle portion in the flow direction of the gas.

4. An installation structure of a pressure detecting apparatus according to claim 1, wherein the throttle passage has an entrance and an exit such that the throttle portion is positioned between the entrance and the exit in the throttle passage, and a gas flow cross sectional area of the exit is larger than that of the throttle portion but smaller than that of the entrance.

5. An installation structure of a pressure detecting apparatus according to claim 4, wherein a ratio of the gas flow cross sectional areas of the throttle portion, the exit and the entrance falls within a range from 1:5:10 to 1:50:70.

6. An installation structure of a pressure detecting apparatus according to claim 4, wherein a length of the throttle passage from the entrance to the exit is 10 mm to 100 mm and an inner diameter of the throttle is 1 mm to 10 mm.

7. An installation structure of a pressure detecting apparatus according to claim 1, wherein the pressure introducing pipe has a projecting portion protruding from the inner wall into an inside of the throttle passage to position the pressure inlet into the inside of the throttle passage.

8. An installation structure of a pressure detecting apparatus according to claim 7, wherein a length of the projecting portion is 3 mm to 15 mm and a gap between the pressure inlet and the throttle portion in a protruding direction of the pressure introducing pipe into the throttle passage is 1 mm to 5 mm.

9. An installation structure of a pressure detecting apparatus according to claim 7, wherein the pressure inlet is opened toward a downstream of the gas flow.

10. An installation structure of a pressure detecting apparatus according to claim 9, wherein a cross section of the projecting portion perpendicular to the protruding direction of the pressure introducing pipe into the throttle passage is formed in a shape of an ellipse having a long axis in a flow direction of the gas.

11. An installation structure of a pressure detecting apparatus according to claim 1, further comprising:

a filter element having ventilating holes is provided inside the pressure introducing pipe between the pressure inlet and the pressure outlet.

12. An installation structure of a pressure detecting apparatus according to claim 1, wherein the pressure introducing pipe comprises a first passage having gas entrance and gas exit on opposite ends thereof and a second passage connected at one end thereof to the first passage between the gas entrance and the gas exit and at another end to the pressure detecting apparatus so that the gas entrance and gas exit of the first passage constitute the pressure inlet and the another end of the second pipe constitutes the pressure outlet, and, further, wherein a part of the gas flowing in the pipe member bypasses the first passage and flows from the gas entrance to the gas exit due to a pressure difference between the gas entrance and the gas exit.

13. An installation structure of a pressure detecting apparatus installed on a pipe member for an intake and exhaust system of an internal combustion engine, comprising:

a throttle valve for introducing gas into the pipe member, an amount of the introduced gas being variable according to an operation of the internal combustion engine; and a pressure introducing pipe having a pressure inlet and a pressure outlet, which is connected on a side of the pressure inlet to the pipe member downstream of the throttle valve and on a side of the pressure outlet to the pressure detecting apparatus so that inner pressure in the pipe member may be introduced to and detected by the pressure detecting apparatus, wherein the pressure introducing pipe has a projecting portion partly protruding into an inside of the pipe member to open the pressure inlet toward a downstream of the gas flow, the projecting portion on an upstream side of the gas flow being provided with a tapered portion inclined by a predetermined angle with respect to an protruding direction of the pressure introducing pipe into the pipe member.

14. An installation structure of a pressure detecting apparatus according to claim 13, wherein the predetermined angle is 10 to 70 degrees.

15. An installation structure of a pressure detecting apparatus according to claim 13, wherein the projecting portion on an upstream side of the gas flow is shaped convex to constitute an acute angle portion having 10 to 70 degrees angle in a cross section thereof perpendicular to the protruding direction of the pressure introducing pipe into the pipe member.

16. An installation structure of a pressure detecting apparatus according to claim 13, wherein a cross section of the projecting portion perpendicular to the protruding direction of the pressure introducing pipe into the pipe member is formed in a shape of an ellipse having a long axis in a flow direction of the gas.

17. An installation structure of a pressure detecting apparatus according to claim 16, wherein the ellipse is a streamlined shape whose area is narrower on a downstream side of the gas flow.

18. An installation structure of a pressure detecting apparatus according to claim 13, wherein a gas flow area at an opening portion of the pressure inlet is not larger than that at any other portion of the pressure introducing pipe.

19. An installation structure of a pressure detecting apparatus according to claim 13, wherein at least one of a blow-by gas introducing pipe and an EGR introducing pipe is connected to the pipe member for recirculating a part of the gas, and, further wherein the pressure introducing pipe is connected to the pipe member on a downstream side of the gas flow with respect to the at least one of the blow-by gas introducing pipe and the EGR introducing pipe.

20. An installation structure of a pressure detecting apparatus installed on a pipe member for an intake and exhaust system of an internal combustion engine, comprising:

a throttle valve for introducing gas into the pipe member, an amount of the introduced gas being variable according to an operation of the internal combustion engine; and a pressure introducing pipe having a pressure inlet and a pressure outlet, which is connected on a side of the pressure inlet to the pipe member downstream of the throttle valve and on a side of the pressure outlet to the pressure detecting apparatus so that inner pressure in the pipe member may be introduced to and detected by the pressure detecting apparatus, wherein the pressure introducing pipe has a projecting portion partly protruding inside the pipe member to open the pressure inlet toward a downstream of the gas flow, the pressure inlet being formed in a slit shape long narrow along a protruding direction of the projecting portion into the pipe member.

21. An installation structure of a pressure detecting apparatus according to claim 20, wherein at least one of a blow-by gas introducing pipe and an EGR introducing pipe is connected to the pipe member for recirculating a part of the gas, and, further wherein the pressure introducing pipe is connected to the pipe member on a downstream side of the gas flow with respect to the at least one of the blow-by gas introducing pipe and the EGR introducing pipe.

22. A pressure detecting apparatus to be installed on a pipe member for an intake and exhaust system of an internal combustion engine, comprising:

a throttle valve for introducing gas into the pipe member, an amount of the introduced gas being variable according to an operation of the internal combustion engine; and first and second pressure introducing passages, the first passage having a gas entrance and a gas exit on opposite ends thereof, which are opened to an inside of the pipe member downstream of the throttle valve, and the second passage being connected at one end thereof to the first passage between the gas entrance and the gas exit and at another end to the pressure detecting apparatus so that a part of the gas flowing in the pipe member bypasses the first passage and flows from the gas entrance to the gas exit due to a pressure difference between the gas entrance and the gas exit, while inner pressure in the pipe member may be introduced to and detected by the pressure detecting apparatus.

23. A pressure detecting apparatus according to claim 22, wherein the gas entrance is positioned on an upstream side of the gas flow and the gas exit is positioned on a downstream side of the gas flow in the pipe member.

24. A pressure detecting apparatus according to claim 22, wherein a gas flow cross sectional area of the first passage is larger than that of the second passage.

25. A pressure detecting apparatus according to claim 22, wherein the gas flow cross sectional area of the first passage is within a range of 5 to 320 mm$^2$ and a total length thereof is within a range of 5 to 100 mm, and the gas flow cross sectional area of the second passage is within a range of 5 to 320 mm$^2$ and a total length thereof is within a range of 1 to 100 mm.

* * * * *